United States Patent [19]
Srinivasan et al.

[11] Patent Number: 5,893,108
[45] Date of Patent: *Apr. 6, 1999

[54] SYSTEM, METHOD, AND COMPUTER PROGRAM PRODUCT FOR EFFICIENTLY TRANSLATING RELATIONAL TUPLES TO OBJECT-ORIENTED OBJECTS

[75] Inventors: Venkatachary Srinivasan; Bhaskar Parvathaneny, both of Santa Clara, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 919,176

[22] Filed: Aug. 28, 1997

Related U.S. Application Data

[63] Continuation of Ser. No. 470,504, Jun. 6, 1995, abandoned, Division of Ser. No. 366,541, Dec. 29, 1994, abandoned.

[51] Int. Cl.$^6$ .................................................. G06F 17/30
[52] U.S. Cl. ........................................... 707/103; 711/118
[58] Field of Search ........................ 707/1, 103; 711/118

[56] References Cited

U.S. PATENT DOCUMENTS

| | | | |
|---|---|---|---|
| 5,212,787 | 5/1993 | Baker et al. | 395/600 |
| 5,291,583 | 3/1994 | Bapat | 395/500 |
| 5,426,747 | 6/1995 | Weinreb et al. | 395/600 |
| 5,448,727 | 9/1995 | Annevelink | 395/600 |
| 5,499,371 | 3/1996 | Henninger et al. | 395/700 |
| 5,504,885 | 4/1996 | Alashqur | 395/600 |
| 5,550,971 | 8/1996 | Brunner et al. | 395/161 |
| 5,596,746 | 1/1997 | Shen et al. | 395/612 |
| 5,615,362 | 3/1997 | Jensen et al. | 707/103 |
| 5,706,506 | 1/1998 | Jensen et al. | 707/103 |

OTHER PUBLICATIONS

Kemper et al., "Adaptable Pointer Swizzling Stragies in Object Bases" Engineering, 1993, 9th International.

Moss et al., "Working with Persistent Objects To swizzle or Not to swizzle" IEEE Transaction on Software Engineering, vol. 18, No. 8, Aug. 1992.

Urban et al., "AN Object–Oriented Query Language Interface to Relational Databases in a Multidatabase Database Environment" IEEE, p. 387394, Jan. 1994.

*Primary Examiner*—Thomas G. Black
*Assistant Examiner*—Jean M. Corrielus
*Attorney, Agent, or Firm*—Sterne, Kessler, Goldstein & Fox P.L.L.C.

[57] ABSTRACT

A procedure for translating tuples received from a relational database management system (RDBMS) to object-oriented objects is described. The procedure operates by instantiating one or more application objects, and then setting base attributes of the application objects using information in the tuples. One or more intermediate objects are created using information in the tuples to represent those application objects having relationship attributes requiring dereferencing. Relationship attributes in the application objects are then set by swizzling the intermediate objects (rather than by swizzling the application objects themselves).

34 Claims, 20 Drawing Sheets

FIG. 13

```
OBJECT QUERY
    Emp [:salary > 10:]

PREFETCH PATH
    Emp.Dept

Relational Schema                           Object Schema
Employee(eid,ename,salary,deptid)       Emp(eid,ename,salary,dept)
Department(did,dname)                   Dept(did,dname,empset)

Required Query
    SELECT  E.eid, E.ename, D.did, D.dname, E.salary
    FROM    Employee E, Department D
    WHERE   E.salary > 10 AND
            E.deptid LEFT JOIN D.did Relational Queries
    SELECT  E.eid, E.ename, E.deptid, E.salary  ⎫
    FROM    Employee E                          ⎪
    WHERE   E.salary > 10                       ⎬ 1302
    ORDER   BY E.deptid                         ⎭

SELECT  D.did, D.dname                              ⎫
    FROM    Employee E, Department D                    ⎪
    WHERE   E.salary > 10 AND E.deptid = D.did          ⎬ 1304
    ORDER   BY D.did                                    ⎭
```

FIG. 14

OBJECT QUERY
   Emp [:salary > 10:]

PREFETCH PATH
   Emp.projset

```
    Relational Schema                    Object Schema
Employee(eid,ename,salary)           Emp(eid,ename,salary,projset)
Project(pid, pname)                  Proj(pid,dname)
Worksin(eid, pid) - intermediate table for projset Required Query
    SELECT  E.eid, E.ename, E.salary, P.pid, P.pname
    FROM    Employee E, Worksin EP, Project P
    WHERE   E.salary > 10 AND
            E.eid LEFT JOIN EP.eid AND EP.pid = P.pid Relational Queries
    SELECT  E.eid, E.ename, E.salary  ⎤
    FROM    Employee E                ⎥
    WHERE   E.salary > 10             ⎬ 1402
    ORDER   BY E.eid                  ⎦

SELECT  EP.eid, EP.pid                            ⎤
    FROM    Employee E, Worksin EP                    ⎥
    WHERE   E.salary > 10 AND E.eid = EP.eid          ⎬ 1404
    ORDER   BY EP.eid                                 ⎦

SELECT  P.pid, P.pname                                              ⎤
    FROM    Employee E, Worksin EP, Project P                           ⎥
    WHERE   E.salary > 10 AND E.eid = EP.eid AND EP.pid = P.pid         ⎬ 1406
    ORDER   BY P.pid                                                    ⎦
```

SYSTEM, METHOD, AND COMPUTER PROGRAM PRODUCT FOR EFFICIENTLY TRANSLATING RELATIONAL TUPLES TO OBJECT-ORIENTED OBJECTS

This application is a division of application Ser. No. 08/470,504, filed Jun. 6, 1995, now abandoned which is a division of application Ser. No. 08/366,541, filed Dec. 29, 1994, (status:abandoned).

CROSS-REFERENCE TO OTHER APPLICATIONS

The following application of common assignee contains some common disclosure, and is believed to have an effective filing date identical with that of the present application: U.S. patent application entitled "Generating an Optimized Set of Relational Queries for Fetching Data in an Object-Relational Database Gateway", Ser. No. 08/810,581, now U.S. Pat. No. 5,765,159 incorporated herein by reference in its entirety.

BACKGROUND OF THE INVENTION

1. Field of the Invention

The present invention relates generally to databases, and more particularly to a system and method for efficiently translating tuples retrieved from a relational database to object-oriented objects.

2. Related Art

An object-oriented computing environment typically includes an object-oriented database (or multiple object-oriented databases) for storing data according to an object-oriented database schema. The object-oriented database schema specifies the information needed to define the classes and the class hierarchy for the objects stored in the object-oriented database, such as the attributes for each class, the data type of each attribute, etc.

A great amount of data is currently stored in existing relational database management systems (RDBMS), such as DB2 produced by International Business Machines (IBM) Corporation, Oracle produced by Oracle Corp., and Sybase produced by Sybase Inc. Data is stored in a relational database according to a relational database schema, which specifies the tables in the relational database, the number of columns in each table, the nature of such columns, etc.

It would be beneficial if applications operating in object-oriented computing environments could access in an object-oriented manner data in relational database management systems. However, there are many problems that must be overcome before such object-oriented access to relational database management systems can be allowed. These problems stem from the fact that data is stored in a relational database according to a relational database schema, whereas data is stored in an object-oriented database according to an object-oriented database schema.

For example, a relational database management system typically returns tuples (i.e., rows of a table) when it is queried. An object-oriented application, however, does not expect to receive tuples when it makes an object-oriented database query. Instead, the object-oriented application expects to receive objects (or pointers to objects).

Thus, what is required is a system and method for enabling an object-oriented application to access data in a relational database management system in an object-oriented manner. In particular, what is required is a system and method for efficiently translating tuples retrieved from a relational database to object-oriented objects. The object-oriented objects are provided (either directly or via pointers) to the object-oriented application.

SUMMARY OF THE INVENTION

Briefly stated, the present invention is directed to a system and method for translating tuples received from a relational database management system (RDBMS) to object-oriented objects. The present invention operates by instantiating one or more application objects, and then setting base attributes of the application objects using information in the tuples. One or more intermediate objects are created using information in the tuples to represent those application objects having relationship attributes requiring dereferencing. Relationship attributes in the application objects are then set by swizzling the intermediate objects (rather than by swizzling the application objects themselves).

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 13 and 14 are used to describe the manner in which relational queries are generated from an object query and zero or more prefetch paths.

DETAILED DESCRIPTION OF THE PREFERRED EMBODIMENTS

Figure 1:
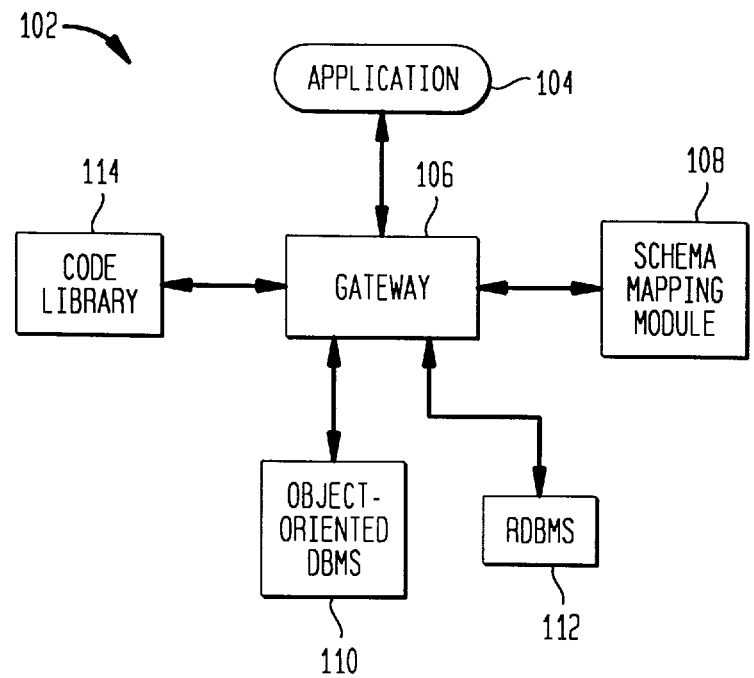
FIG. 1 is a block diagram of an object-oriented computing environment according to a preferred embodiment of the present invention.

FIG. 1 is a block diagram of an object-oriented computing environment 102 according to a preferred embodiment of the present invention. The object-oriented computing environment 102 includes at least one object-oriented database management system (DBMS) 110 which stores data according to an object-oriented database schema. The object-oriented database schema specifies the information needed to define the classes and the class hierarchy for the objects stored in the object-oriented DBMS 110, such as the attributes for each class, the data type of each attribute, etc. A suitable form of the object-oriented DBMS is the "Object-Store" DBMS produced by Object Design of Burlington, Mass. However, any other commercial object-oriented DBMS is also suitable.

The object-oriented computing environment 102 also includes at least one relational database management system (RDBMS) 112. The RDBMS 112 can also be viewed as existing outside of the object-oriented computing environment 102, but physically connected to components in the object-oriented computing environment 102 (in particular, to a gateway 106). A suitable form of the RDBMS 112 is DB2 produced by IBM, Oracle produced by Oracle Corp., and/or Sybase produced by Sybase Inc.

Object-oriented applications, such as application 104, access the data in the object-oriented DBMS 110. Such access is performed in a well known, object-oriented manner according to a well known object-oriented database interface. The object-oriented database interface is consistent with the object-oriented database schema of the object-oriented DBMS 110.

The present invention also allows the application 104 to access the data in the RDBMS 112 via an object-relational database gateway 106. According to the present invention, the application 104 accesses the RDBMS 112 in an object-oriented manner. It should be understood that, while the invention is described herein in terms of having a relational database management system, the present invention is also adapted for use with other non-object-oriented database management systems, such that these other database management systems can be accessed in an object-oriented manner.

Figure 4:
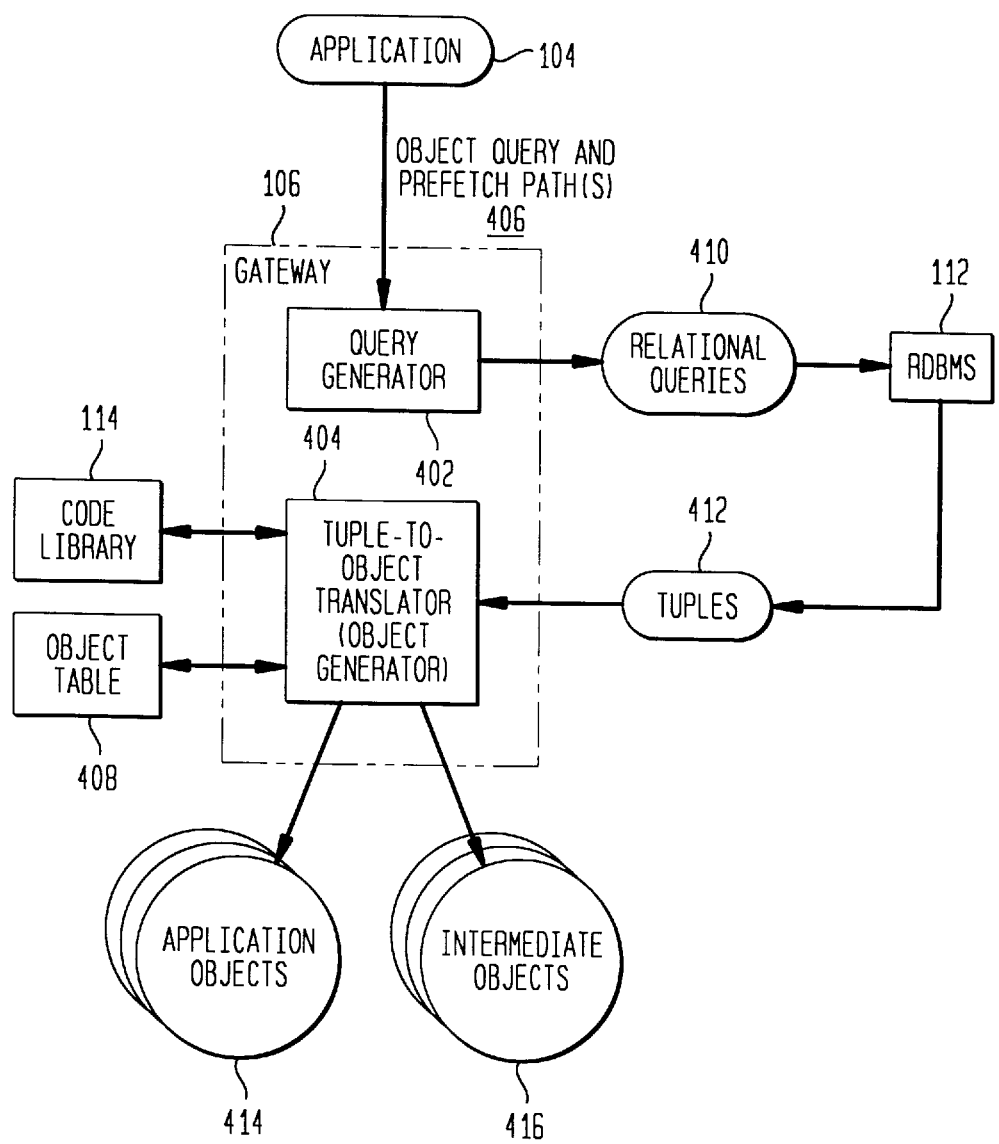
FIG. 4 is a block diagram of a gateway according to a preferred embodiment of the present invention.

According to the present invention, the application 104 generates and transfers object-oriented database queries (also called object queries herein) and an (optional) set of prefetch paths associated with the object queries to the gateway 106. As shown in FIG. 4, the gateway 106 includes a query generator 402 and a tuple-to-object translator (also called an object generator) 404. For illustrative purposes, the query generator 402 is shown as receiving an object query and zero or more prefetch paths 406 from the application 104.

The query generator 402 analyzes the object query and its prefetch paths 406 and generates a set of relational database queries 410 (also called relational queries herein). These relational queries 410 are capable of retrieving from the RDBMS 112 the information (i.e., tuples 412) indicated by the object query and its prefetch paths 406. (While the relational queries 410 are shown as being directed to the RDBMS 112 from the query generator 402, in another embodiment of the invention the relational queries 410 are instead passed to the object generator 404, and the object generator 404 issues the queries 410 to the RDBMS 112. This is described further below.) The manner in which the query generator 402 generates the relational database queries is described in U.S. patent application entitled "Generating an Optimized Set of Relational Queries for Fetching Data in an Object-Relational Database Gateway," referenced above and incorporated by reference herein.

The RDBMS 112 returns tuples 412 (i.e., rows from one or more tables) as a result of processing the relational queries 410. The object generator 404 receives these tuples 412. According to the present invention, the object generator 404 does not transfer these tuples 412 to the application 104, since the application 104 expects to receive object-oriented objects, not tuples. Instead, the object generator 404 efficiently translates these tuples into object-oriented objects, called application objects 414. In performing this function, the object generator 404 performs "swizzling." Swizzling is a well known database term. As used with the present invention, swizzling refers to the process of: (a) converting foreign keys (described below) to pointers or sets of pointers; and (b) setting relationship attributes (described below) in application objects equal to these pointers.

While operating as just described above, the object generator 404 calls functions contained in a code library 114, and generates an object table 408 and intermediate objects 416. The object generator 404 transfers the application objects 414 (or pointers to the application objects 414) to the application 104. The object generator 404 is described in greater detail below.

Figure 2:
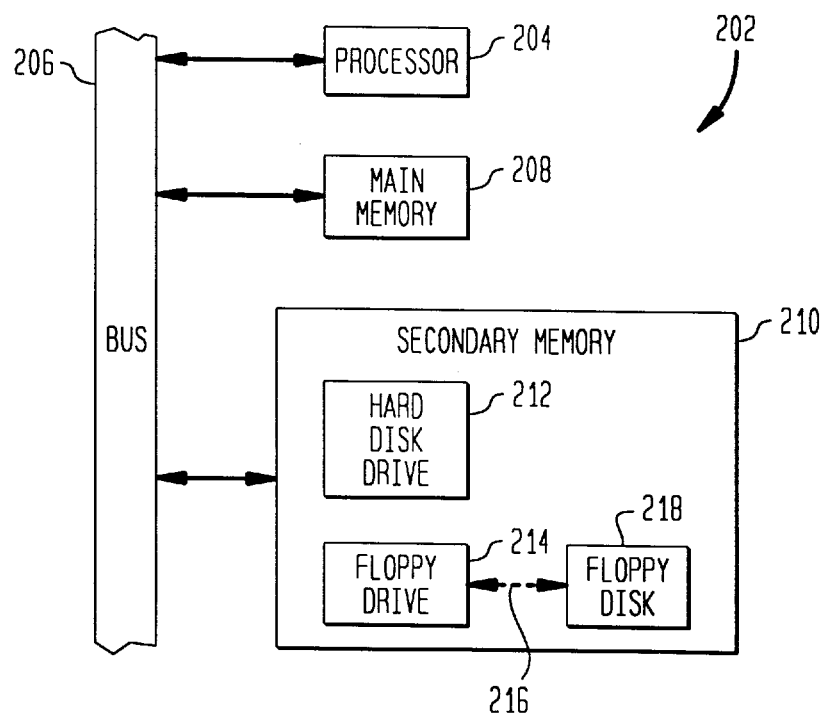
FIG. 2 is a block diagram of a computer system in which the computing environment of FIG. 1 resides.

The object-oriented computing environment 102 preferably exists in a computer system 202 as shown in block diagram form in FIG. 2. The computer system 202 includes one or more processors, such as processor 204, which is connected to a communication bus 206. The computer system 202 also includes a main memory 208, preferably random access memory (RAM), and a secondary memory 210 that includes, for example, a hard disk drive 212 and a floppy disk drive 214.

The application 104, gateway 106, schema mapping module 108 (described below), code library 114 (described below), object-oriented DBMS 110, and RDBMS 112 preferably represent computer programs and/or libraries which reside (during run-time) in the main memory 208, and which are executed by the processors in the computer system 202, such as processor 204. (The data maintained by the object-oriented DBMS 110 and the RDBMS 112 may be stored in the main memory 208 and/or the secondary memory 210. Also, the computer programs/libraries associated with the application 104, gateway 106, schema mapping module 108, code library 114, object-oriented DBMS 110, and RDBMS 112 may be stored in a floppy disk 218 or some other removable storage medium, which is read by the floppy drive 214 or some other storage unit). The computer system 202 may also be connected to a network. In this case, data may be retrieved from relational tables stored in storage devices in communication with the computer system 202 via the network.

The gateway 106, the schema mapping module 108, and the code library 114, when executed, enable the computer system 202 to perform the features of the present invention as discussed herein. Thus, the gateway 106, the schema mapping module 108, and the code library 114 represent controllers of the computer system 202.

A suitable form of the computer system 202 is the well known RISC System/6000 family of computers produced by IBM. Alternatively, the computer system 202 is the well known System/390 family of computers produced by IBM. It should be understood, however, that other computers could alternatively be used without departing from the scope and spirit of the present invention.

Schema Mapping Module

According to the present invention, the application 104 is enabled to access the RDBMS 112 in an object-oriented manner. In other words, the application 104 works using an object-oriented view of the relational database schema. All operations initiated by the application 104 which involve the RDBMS 112 are in the object-oriented database schema.

However, since the RDBMS 112 stores data according to a relational database schema, there needs to be a mechanism by which the relational database schema is mapped to the object-oriented database schema. In the present invention, this mechanism is represented by the schema mapping module 108.

The schema mapping module 108 maps the relational database schema of the RDBMS 112 into the object-oriented schema associated with the object-oriented DBMS 110. The schema mapping module 108 preferably represents a schema mapping object that is stored persistently and that can be used when accessing relational data using the object-oriented schema.

As discussed above, the query generator 402 analyzes object queries and their prefetch paths (if any) and generates a set of relational database queries. In performing this function, the query generator 402 interacts with the schema mapping module 108. This is discussed in detail in U.S. patent application entitled "Generating an Optimized Set of Relational Queries for Fetching Data in an Object-Relational Database Gateway," referenced above and incorporated by reference herein.

Figure 3:
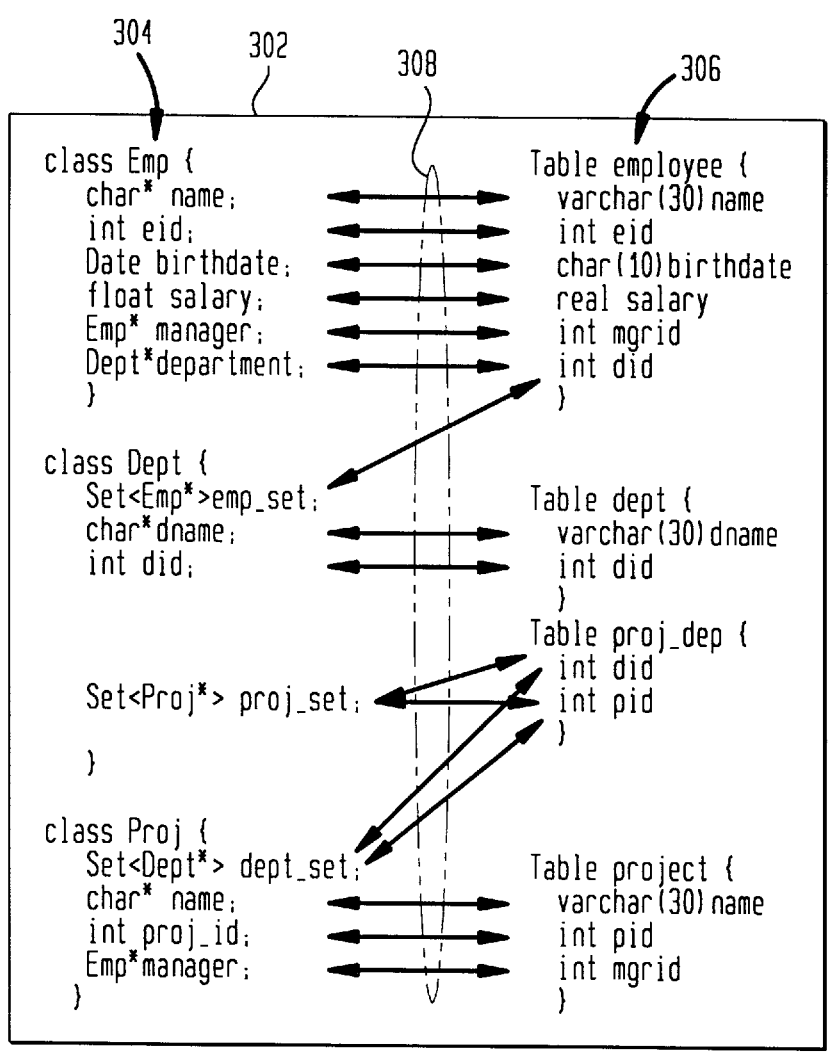
FIG. 3 illustrates an example schema mapping.

An example of a schema mapping is provided in FIG. 3, which shows a representation of an object-oriented database schema 304 and a representation of a relational database schema 306. A schema mapping between the object-oriented database schema 304 and the relational database schema 306 is indicated by arrows 308 (for example, the pointer "name" in the class "Emp" maps to the variable "name" in the table "employee"). Thus, if so queried, the schema mapping module 108 would indicate that the 30 character string variable "name" in the table employee maps to a pointer "name" in the class Emp which points to a character string.

Schema mapping is a well known process. Accordingly, the discussion below focuses on particular characteristics of the schema mapping module 108 which are pertinent to the present invention. Implementation of the schema mapping module 108 as described herein will be apparent to persons skilled in the relevant art.

According to the present invention, each class is assumed to be mapped to a single relational table or view (although intermediate tables are used to represent many-to-many relationships, as discussed below). Thus, in the example of FIG. 3, class "Emp" maps to table "employee," class "Dept" maps to table "dept," and class "Proj" maps to table "project." An intermediate table "proj_dep" is used to represent the many-to-many relationship involving "proj_set" and "dept_set."

In this scheme, if a class needs to be mapped to multiple tables or views, a new view is created in the relational database which incorporates the definitions of one or more tables or views and the class is subsequently mapped to the newly created view.

Also according to the present invention, every class in the schema mapping is assumed to have two types of attributes, base attributes and relationship (or non-base) attributes. Base attributes are the attributes in a class that do not contain pointers to other objects. Thus, in the example of FIG. 3, with respect to the class "Emp," the following are base attributes: name, eid, birthdate, and salary.

Relationship attributes in a class are the attributes that are not base attributes, namely they are either pointer valued attributes or set valued attributes that contain pointers to other objects. In the example of FIG. 3, with respect to the class "Emp," the following are relationship attributes: manager (which is a pointer to an object of class Emp) and department (which is a pointer to an object of class Dept).

According to the present invention, the schema mapping module 108 can be accessed and queried (by the gateway 106, for example). The schema mapping module 108 can be queried for the following information:

1. Given the name of a class (or a collection), return the following:
   (a) The table which corresponds (i.e., maps) to the class, and the set of columns in the corresponding table which map to the base attributes of the class. For example, if the class "Emp" is passed to the schema mapping module 108, then the schema mapping module 108 would return information identifying the following columns of the relational table "employee": name, eid, birthdate, and salary.
   (b) The column(s) of the primary key in the table which corresponds to the class. As is well known, a primary key uniquely identifies each row, also called tuple, in a relational table. For example, assume that "eid" is the primary key in the table "employee." If the class "Emp" is passed to the schema mapping module 108, then the schema mapping module 108 would return information identifying the column "eid" of the table employee.
2. Given the name of a relationship in the form of a path expression (a pointer or a set of pointers) (e.g., Emp.department), return the following information:
   (a) The member name and arity of the reverse pointer (if one exists) from the target class to the source class. The target class is the class of the object pointed to by the path expression provided to the schema mapping module 108. The source class is the class in which the path expression (i.e., pointer) is contained. In some instances, the target class will contain a pointer that points back to the source class. This is called a reverse pointer. In such cases, the schema mapping module 108 returns the name of this reverse pointer. The schema mapping module 108 also returns the arity of the relationship between the source class and the target class with respect to the reverse pointer (i.e., whether it is one-to-one, one-to-many, many-to-many, or many-to-one).
   (b) The foreign key or list of foreign keys (in intermediate tables) in this corresponding relational table that defines the relationship provided to the schema mapping module 108. A foreign key is a value in the corresponding relational table that maps to a non-base attribute in the class. Thus, in table employee of FIG. 3, mgrid and did are foreign keys. If Emp.department is passed to the schema mapping module 108, then the schema mapping module 108 returns "rdid," which is the foreign key that maps to "department" in the class Emp.
   (c) The arity (e.g., one-to-one, one-to-many, many-to-many, many-to-one) of the relationship provided to the schema mapping module 108. Assume that the class Emp includes the following definition:
   Emp* spouse;
   Also assume that the table employee includes the following definition:
   int spouseid;
   This represents a one-to-one relationship, since each person (presumably) has a single spouse. Thus, if Emp.spouse is passed to the schema mapping module 108, the schema mapping module 108 would return an arity of "one-to-one". Now assume that Emp.department is passed to the schema mapping module 108. Each employee has a single department, but each department may contain many employees. This relationship is represented in the class Dept by the set "emp_set" of pointers to Emp objects ("did" is also the foreign key for emp_set). Thus, this represents a "many-to-one" relationship (or, equivalently, a "one-to-many" relationship). Accordingly, the schema mapping module 108 would return an arity of "many-to-one".

(d) The primary key in the table that maps to the owning class. The owning class is the class whose objects are pointed to by the pointer provided to the schema mapping module 108. For example, the owning class of the pointer department in class Emp is "Dept". Table dept maps to class Dept; thus, the schema mapping module 108 returns "did" (assuming that did is the primary key of table dept). The owning class of the pointer manager in class Emp is "Emp". Table employee maps to class Emp; thus, the schema mapping module 108 returns "eid" (assuming that eid is the primary key of table Emp).

Prefetch Paths

As is well known, a given object may store pointers to other objects. These other objects may be accessed by accessing the pointers in the given object. Thus, in order to access these other objects via the given object, it is necessary to dereference such pointers in the given object (the term "dereference" or "dereferencing" refers to the process of accessing an object's values given a pointer to the object, i.e., the process of going to the actual object from a pointer is termed dereferencing a pointer).

As discussed below, the query generator 402 generates a translated object query (which is a relational query) directly from the object query passed to the query generator 402 from the application 104. This translated object query is capable of retrieving from the RDBMS 112 the information needed to construct the base attributes of the given object (called the top-level object). More work is needed, however, to initialize other objects pointed to by the relationship attributes in the top-level object.

One way to prefetch objects is to recursively retrieve all objects pointed to by objects that are the result of the top level query. (As used herein, the term "prefetching" refers to the operation of retrieving data from the RDBMS 112, in response to an object query, for the purpose of initializing objects related to objects that form the result of the object query.) This would almost certainly result in major performance problems by fetching too many objects that are not needed by the application 104.

A second alternative is to not fetch any object except the top-level objects but initialize the pointers using some special values. Attempts to access such special pointers will lead to an interrupt that can be trapped and the object pointed-to can be retrieved at that time. This second solution is called "object faulting" and can also cause performance problems since dereferencing every pointed-to object will cause a relational query to be generated and executed to retrieve one object. This will also most likely result in low performance.

The query generator 402 preferably employs a third approach to prefetch data. According to this third approach, the application 104 (or user) is required to provide zero or more prefetch paths with the object query. If a prefetch path is not provided, then only the base attributes of the top-level objects are initialized. If additional objects (pointed to by the top-level objects) need to be prefetched and initialized, then the user must explicitly specify the paths (starting from the top-level objects) leading to those objects. Only the objects along these paths (called the prefetch paths) are fetched and initialized. Other relationship attributes that are not along the specified prefetch paths will have invalid pointers.

Prefetch paths are passed by the user or application 104 as strings along with the original object query. The query generator 402 uses the translated object query and the prefetch paths (as well as information obtained from the schema mapping module 108) to generate relational queries 410 that are capable of retrieving from the RDBMS 112 all data (i.e., tuples 412) needed to initialized the objects and the attributes indicated by the prefetch paths.

If no prefetch paths are passed, then only the base attributes of the top level objects are returned. Any attempt to dereference the relationship attributes in these objects will result in an exception.

The following information is part of the prefetch path information:

1. Top Level Class: This parameter provides the name of the class being queried by the object query. Any information on this class can be obtained by accessing the schema mapping module 108.

2. Prefetch Path Set: A set of path strings specify relationships along a path starting from the top level class. For example, paths starting from Emp class in FIG. 3 include "department.proj_set.dept_set", "proj_set", "manager.manager", "department.emp_set", etc.

Query Generator

As discussed above, the query generator 402 generates a set of relational queries 410 from an object query and zero or more prefetch paths 406 provided by the object-oriented application 104. These relational queries are capable of retrieving from the RDBMS 112 the information (tuples 412) indicated by the object query and the prefetch paths 406. The query generator 402 is described in this section.

The query generator 402 analyzes the object query (issued by the application 104) and generates a relational query (called the translated object query) that is capable of retrieving from the RDBMS 112 all of the base attributes for the top-level object(s). The top-level objects are defined as the objects which can be constructed using the data that is retrieved from the relational database as a result of executing the object query. In other words, the top-level objects are explicitly identified by the object query.

For example, consider the following example object query (all object queries shown herein are based on the well known ObjectStore Query Language, described in Orenstein et al., "Query Processing in the ObjectStore Database System", *Proceedings of the ACM SIGMOD Conference*, San Diego, Calif., 403–412, Jun. 1992, incorporated herein by reference).

Employees [:salary>20000:]

This object query, which is based on the example classes and tables shown in FIG. 3, operates to retrieve all objects (these are the top-level objects) of class Emp where the salary base attribute is greater than 20,000. The query generator 402 generates the following relational query (i.e., translated object query) from the above object query:

SELECT E.name, E.eid, E.birthdate, E.salary
FROM Employee E
WHERE salary>20000

Note that this translated object query operates to retrieve from the RDBMS 112 only the base attributes (i.e., name, eid, birthdate, and salary) for only the top level objects. This translated object query does not retrieve any information needed to initialize the non-base attributes (such as manager or department). Also, this translated object query does not retrieve any attributes (base or otherwise) from any objects other than the top level object. Non-top level objects include, for example, the objects pointed to by the manager and department pointers.

Relational queries are represented herein using well known SQL strings. (As will be appreciated, SQL (structured query language) is a well known database language first produced by International Business Machines (IBM) Corporation.) This high-level representation is used here to simplify the presentation of the algorithms and concepts involved and a real system implementing this algorithm could easily represent relational queries internally using alternate graph structures which are equivalent to SQL statements that have been parsed. The algorithm presented here will work with no changes for internal representations that are not strings.

After generating the translated object query, the query generator 402 translates the prefetch paths (if any), which are in object-oriented form, to a nested representation of prefetch paths still in object-oriented form. The query generator 402 then analyzes the translated object query and the nested representation of prefetch paths and generates a set of relational queries 410 for accessing the RDBMS 112. These relational queries 410 are capable of retrieving from the RDBMS 112 information (tuples 412) needed to construct objects specified in the prefetch path(s).

The nested representation of prefetch paths is generated by analyzing and collapsing the prefetch paths into a recursive representation (i.e., the nested representation of prefetch paths, also called the nested prefetch structure or nested prefetch path representation) that eliminates duplicates and nests them such that each component in each prefetch path only appears once. The root of this nested prefetch structure is the top level class.

For example, suppose that the top-level class is "Emp", and the prefetch paths include the following: "department", "department.proj_set", and "department.emp_set". In this example, the nested prefetch structure would be as follows:

[department, {[proj_set, {}], [emp_set, {}]}]

After generating the nested prefetch structure, the query generator 402 traverses the nested prefetch structure and generates the relational queries 410 using schema mapping information obtained by appropriately querying the schema mapping module 108. In order to generate these relational queries, it is necessary to follow a number of rules (developed by the inventor). Which rule is followed depends on whether the prefetch paths contain one-to-one, one-to-many, or many-to-many relationships.

Consider, for example, FIG. 13 which specifies an example schema mapping, an object query, and a prefetch path on the schema. The Required Query is also indicated. This scenario represents a 1-to-many relationship, since each employee has one department, but each department may have multiple employees.

The Required Query is the logical query that needs to be executed in order to retrieve all of the tuple data needed to satisfy the object query and the specified prefetch path(s). The translated object query is the relational query that will retrieve the tuple data needed to initialize only the base attributes of the top-level class (i.e., no prefetch paths have been taken into account while generating the translated object query). The translated object query for the scenario in FIG. 13 is as follows (only base attributes of the top-level class will be retrieved):

SELECT E.eid, E.name, E.salary
FROM Employee E
WHERE E.salary >10

FIG. 13 also indicates the relational queries 410 generated by the query generator 402. For this particular object query and prefetch path, two relational queries 1302, 1304 are generated. The first query 1302 operates to retrieve the Employee tuples that satisfy the condition of salary>10 (note that this condition is contained in the original object query). These Employee tuples are sorted by deptid, which is the foreign key to the dept table.

The second query 1304 operates to retrieve the Dept tuples related to the Employee tuples retrieved by the first query 1302. In this instance, a Dept tuple is related to an Employee tuple if the Dept primary key (did) is equal to the corresponding Employee foreign key (deptid). These dept tuples are sorted by did.

Consider now FIG. 14 which specifies another example schema mapping, an object query, and a prefetch path on the schema. The Required Query is also shown. FIG. 14 illustrates a many-to-many relationship, since each employee may be involved with multiple projects, and each project may have multiple employees. The translated object query for the scenario of FIG. 14 is as follows (only base attributes of the top-level class will be retrieved):

SELECT E.eid, E.name, E.salary
FROM Employee E
WHERE E.salary>10

FIG. 14 also indicates the relational queries 410 generated by the query generator 402. For this particular object query and prefetch path, three relational queries 1402, 1404, and 1406 are generated. The first query 1402 operates to retrieve the Employee tuples that satisfy the condition of salary>10 (note that this condition is contained in the original object query). These Employee tuples are sorted by eid, which is the primary key for the employee table.

The second query 1404 involves a query of the intermediate table called "Worksin". Each row of table Worksin specifies an employee (eid) and a project (pid). Thus, the rows of table Worksin indicate which employees are in each project, and which projects each employee is involved in.

The second query 1404 operates to retrieve the Worksin tuples related to the Employee tuples retrieved by the first query 1402. In this instance, a Worksin tuple is related to an Employee tuple if the Employee primary key (e.eid) is equal to the corresponding key (EP.eid) in the Worksin table. These Worksin tuples are sorted by eid.

The third query 1406 operates to retrieve the Project tuples related to the Employee tuples and the Worksin tuples retrieved by the first and second queries 1402, 1404. These Project tuples are sorted by pid.

The relational queries 410 which are generated by the query generator 402 (as just described above) are transferred to the RDBMS 112. The RDBMS 112 retrieves tuples 412 from tables in accordance with these relational queries 410. These tuples 412 are transferred to the object generator 404, which translates these tuples 412 to object-oriented application objects 414.

The query generator 402 is further described in U.S. patent application entitled "Generating an Optimized Set of Relational Queries for Fetching Data in an Object-Relational Database Gateway," referenced above and incorporated by reference herein.

Code Library

As noted above, the object generator 404 efficiently translates the tuples 412 retrieved from the RDBMS 112 into object-oriented objects, called application objects 414. In performing this function, the object generator 404 calls functions contained in a code library 114. The code library 114, which is preferably a generated code library, is described in this section. (According to one embodiment, the code library 114 forms a part of the invention. According to another embodiment, the code library 114 is not part of the invention. In this embodiment, it is assumed that the computing environment in which the invention operates provides a code library 114 having the functionality described herein.)

The code library 114 includes three groups of functions: functions to manipulate application objects, functions to manipulate intermediate objects, and functions to perform auxiliary operations such as manipulating object keys and the object table. The operation of these functions is described below. The actual implementation of these functions is implementation dependent, and depends on such factors as the programming language used, the characteristics of the target machine, etc. Implementation of these functions will be apparent to persons skilled in the relevant art based on the discussion contained herein.

Functions to Manipulate Application Objects

The object generator 404 calls these functions to manipulate application objects. Available functions include functions to create application objects (allocating memory for application objects, then instantiating the application objects in accordance with the object database schema), functions to initialize the base attributes of application objects using tuples retrieved from the RDBMS 112 (this may involve a mapping from the data type of a tuple field to the data type of the corresponding object data member), functions to clean up application objects (remove them from memory), functions to compare the application objects (for example, functions that compare old values of application objects to new values retrieved from tuples and also other functions that compare keys), functions for setting the RDB (relational database) types of the application object data members, functions for initializing the relationship attributes (pointers) of application objects, and functions to identify the tuple columns which map to the application class data members.

Preferably, a set of application object manipulation functions exists for each class. In practice, a base class is defined which generically declares (but does not define) these application object manipulation functions. Derived classes (inheriting from this base class) are then created for each class of interest (such as Emp, Dept, Proj; see FIG. 3). These derived classes define the actual implementations on a per class basis for the application object manipulation functions.

Functions to Manipulate Intermediate Objects

The object generator 404 uses intermediate objects while translating tuples into application objects (intermediate objects are described in a section below). The code library 114 includes functions for manipulating intermediate objects.

Available functions include functions to create intermediate objects (allocating memory for intermediate objects, then instantiating the intermediate objects), functions to initialize the attributes of intermediate objects, and functions to clean up intermediate objects (remove them from memory). Also available are functions to obtain the offset of intermediate object data members, and for identifying the reference/relationship data members (pointers) in intermediate objects.

Preferably, a set of functions to manipulate intermediate objects exists for each class. In practice, a base class is defined which generically declares (but does not define) these intermediate object manipulation functions. Derived classes (inheriting from this base class) are then created for each class of interest (such as Emp, Dept, Proj; see FIG. 3). These derived classes define the actual implementations on a per class basis for the intermediate object manipulation functions.

Functions to Perform Auxiliary Operations

The object generator 404 calls these functions to perform auxiliary operations, such as to manipulate object keys, and to manipulate object tables. Available functions include functions to allocate memory to store object table entries, functions to create and initialize object table entries, functions to free memory being used by object table entries, functions to allocate memory to store intermediate table elements used in swizzling many-to-many relationships, functions to free memory being used by intermediate table elements, and functions to create and otherwise manipulate application object keys. Object keys and object tables are described below.

Object Tables

According to the present invention, the object generator 404 creates and maintains a set of object tables. One object table is created for each class of interest (such as classes Emp, Dept, and Proj in FIG. 3). An object table entry is created for each application object 414.

The object tables are used to ensure that application objects 414 are not duplicated. In other words, the object tables are used to ensure uniqueness of application objects 414.

Figure 5:
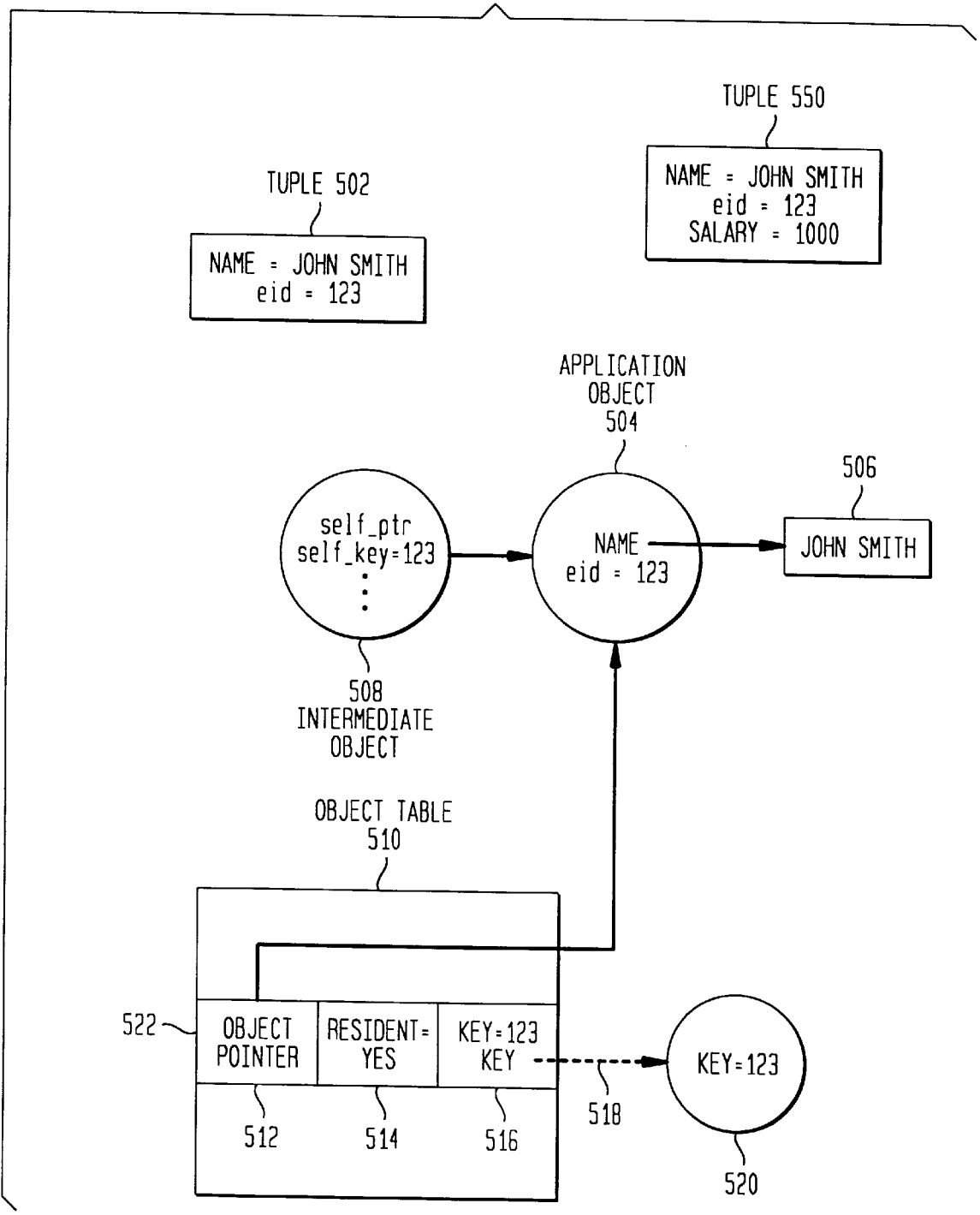
FIG. 5 illustrates an object table.

FIG. 5 illustrates an example object table 510 for class Emp (from FIG. 3). Each entry, such as entry 522, in object table 510 includes an object pointer 512, a resident bit 514, and an object key 516. The object pointer 512 points (i.e., addresses) to the application object associated with the object table entry 522.

For example, assume that tuple 502 is retrieved from table employee in the RDBMS 112. The tuple 502 includes a Name field that is equal to the string "John Smith" and an eid (employee identification) field equal to 123. The object generator 404 generates and initializes an application object 504 (of class Emp) to represent the tuple 502 (the object generator 404 does this by calling appropriate function(s) in the code library 114). This application object 504 includes a name pointer that points to a memory area 506 where the string "John Smith" is stored, and an eid attribute equal to 123.

After generating the application object 504, the object generator 404 operates to create a new object table entry corresponding to the application object 504 in the object table 510 (the object generator 404 does this by calling appropriate function(s) in the code library 114). This new object table entry is shown as entry 522. The object pointer 512 points to the application object 504. The resident field 514 indicates whether the application object 504 is in primary memory (in this example, the application object 504 is in primary memory, so the resident field 514 is equal to "Yes").

The object key 516 is equal to the primary key of the tuple 502, which in this case is equal to eid=123.

Alternatively, the object generator 404 operates to create a key object 520 having a key attribute that is equal to eid=123 (the object generator 404 does this by calling appropriate function(s) in the code library 114). The object key 516 is, in this case, a pointer that points to this key object 520.

Suppose that another tuple 550 is retrieved from table employee in the RDBMS 112. The tuple 502 includes a Name field that is equal to the string "John Smith," an eid field equal to 123, and a salary field equal to 1000. It would be improper for the object generator 404 to generate a new application object for the new tuple 550, because then there would be two application objects for the same employee "John Smith."

According to the present invention, the object generator 404 avoids creating such duplicate application objects (and ensures uniqueness of application objects) by first checking the object table 510 to determine whether an application object already exists for employee "John Smith." In particular, the object generator 404 compares the eid (the primary key) contained in the new tuple 550 with the key field 516 in each entry of the object table 510 (alternatively, to improve performance, the present invention uses well known hashing algorithms to locate entries in the object table 510). If there is a match, then the object generator 404 does not create a new application object. If there is not a match (i.e., an application object for employee "John Smith" does not already exist), then the object generator 404 creates a new application object. Preferably, the object generator 404 performs such checking by calling appropriate function(s) in the code library 114.

Intermediate Objects

The object generator 402 operates to create one or more intermediate objects 416 for each application object 414 that requires swizzling. The object generator 402 creates and manipulates such intermediate objects 416 by calling appropriate function(s) in the code library 114.

While performing swizzling operations, the object generator 402 uses the intermediate objects 416, rather than the application objects 414. This is the case, since intermediate objects 416 are smaller in size than application objects 414. Intermediate objects can be allocated contiguously in memory thus making operations like sort to be extremely efficient on intermediate objects. Thus, performance advantages are achieved by utilizing intermediate objects 416 rather than application objects 414 (if, instead, application objects 414 were used, then significant amounts of memory thrashing could result).

Figure 6:
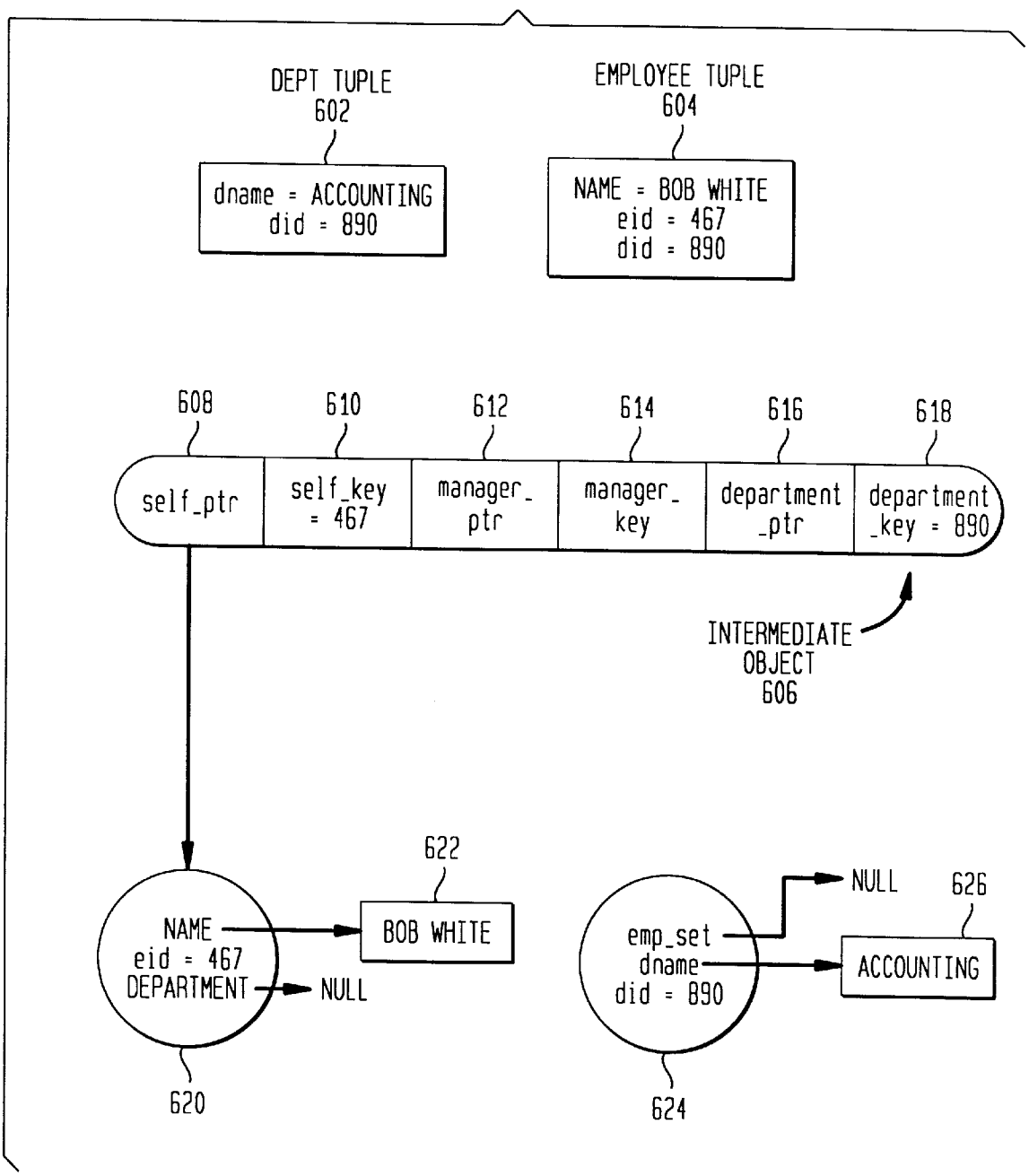
FIG. 6 illustrates an intermediate object.
Figure 7:
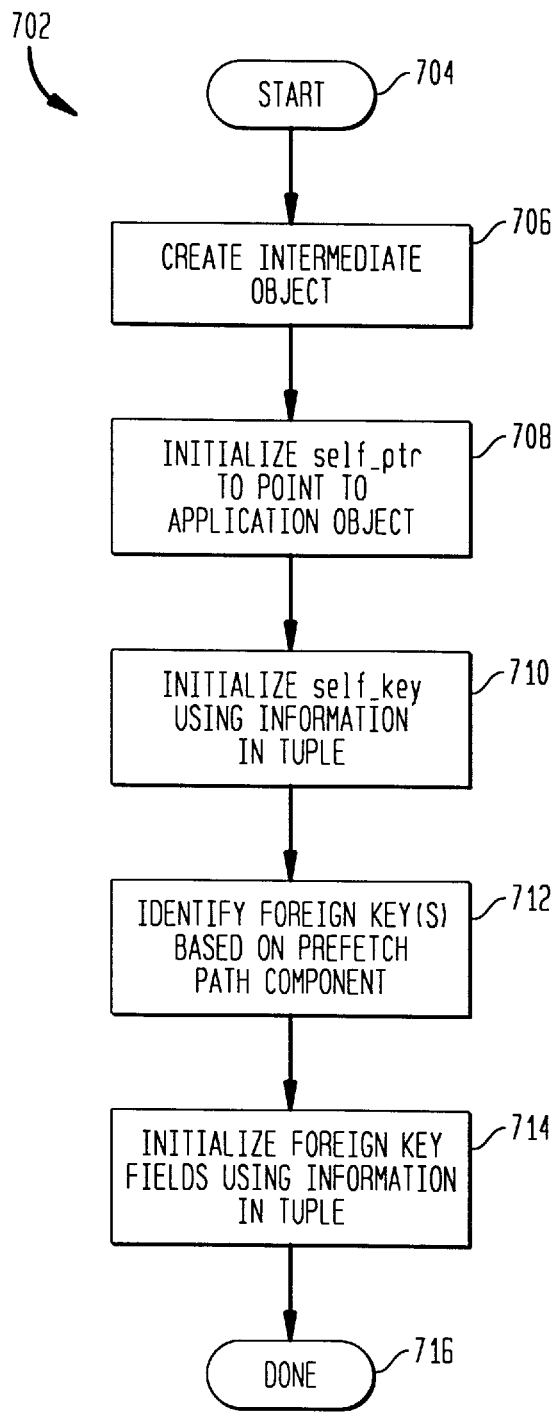
FIG. 7 is a flowchart depicting the manner in which intermediate objects are created and initialized.

FIG. 6 illustrates an example scenario which is used to further describe intermediate objects. Reference shall also be made to a flowchart 702 in FIG. 7, which represents the operation of the object generator 404 when generating and initializing an intermediate object.

In the scenario of FIG. 6, a dept tuple 602 and an employee tuple 604 have been retrieved from the RDBMS 112. The object generator 404 has generated an application object 620 for the employee tuple 604, and another application object 624 for the dept tuple 602. Assume that the prefetch path was as follows: Emp.department. Thus, it will be necessary to set (i.e., swizzle) the department pointer in the Emp application object 620. In other words, the Emp application object 620 is involved in a swizzling operation.

Since the Emp application object 620 is involved in a swizzling operation, the object generator 404 operates to create an intermediate object 606 for the Emp application object 620 (step 706). Intermediate objects always have a self pointer (self_ptr) field 608 and a self key (self_key) field 610. The self pointer field 608 points to the associated application object, which in this case is the Emp application object 620. The self key field is equal to the primary key, which in this case is eid, or 467. The object generator 404 causes both of these fields 608, 610 to be set in this manner (steps 708 and 710).

An intermediate object also contains a pointer field (called the foreign pointer field) and a key field (called the foreign key field) for each foreign key in the relational table that maps to the class of the application object in question. In this case, the application object in question is the Emp application object 620 which is of class Emp. The employee table maps to class Emp. This table employee includes two foreign keys, mgrid (manager id) and did (department id).

Thus, the intermediate object 608 includes a manager pointer (manager_ptr) 612, a manager key (manager_key) 614, a department pointer (department_ptr) 616, and a department key (department_key) 618. The object generator 404 identifies such foreign keys by querying the schema mapping module 108 (step 712).

The prefetch path of this example, i.e., Emp.department, indicates a swizzling operation that involves the did foreign key. The mgrid foreign key is not involved in a swizzling operation (at least with respect to the prefetch path Emp.department). Thus, the object generator 404 does not fill in the manager pointer 612, or the manager key 614.

Since the swizzling operation involves the did foreign key, the object generator 404 does operate to fill in the department pointer 616 and the department key 618. The object generator 404 can fill in the department key 618 immediately, since this information is available in the employee tuple 604. Thus, the object generator 404 sets the department key 618 equal to did, or 890 (step 714). The object generator 404 does not fill in the department pointer 616 until it performs the swizzling operation. At that time, the object generator 404 will fill in the department pointer 616 to point to the Dept object 624 (this is further described below).

It is noted that entries in the object tables (described above) are not created for intermediate objects.

Operation of the Object Generator

According to the present invention, the object generator 404 translates the tuples 412 (retrieved from the RDBMS 112) to application objects 414 by first creating a directed acyclic graph (DAG), and then executing the DAG. The DAG includes a plurality of nodes, where each node represents one or more operations which are to be performed by the object generator 404. Thus, the object generator 404 executes the DAG by executing the nodes in the DAG (i.e., performing the operations specified by the DAG nodes).

Figure 8:
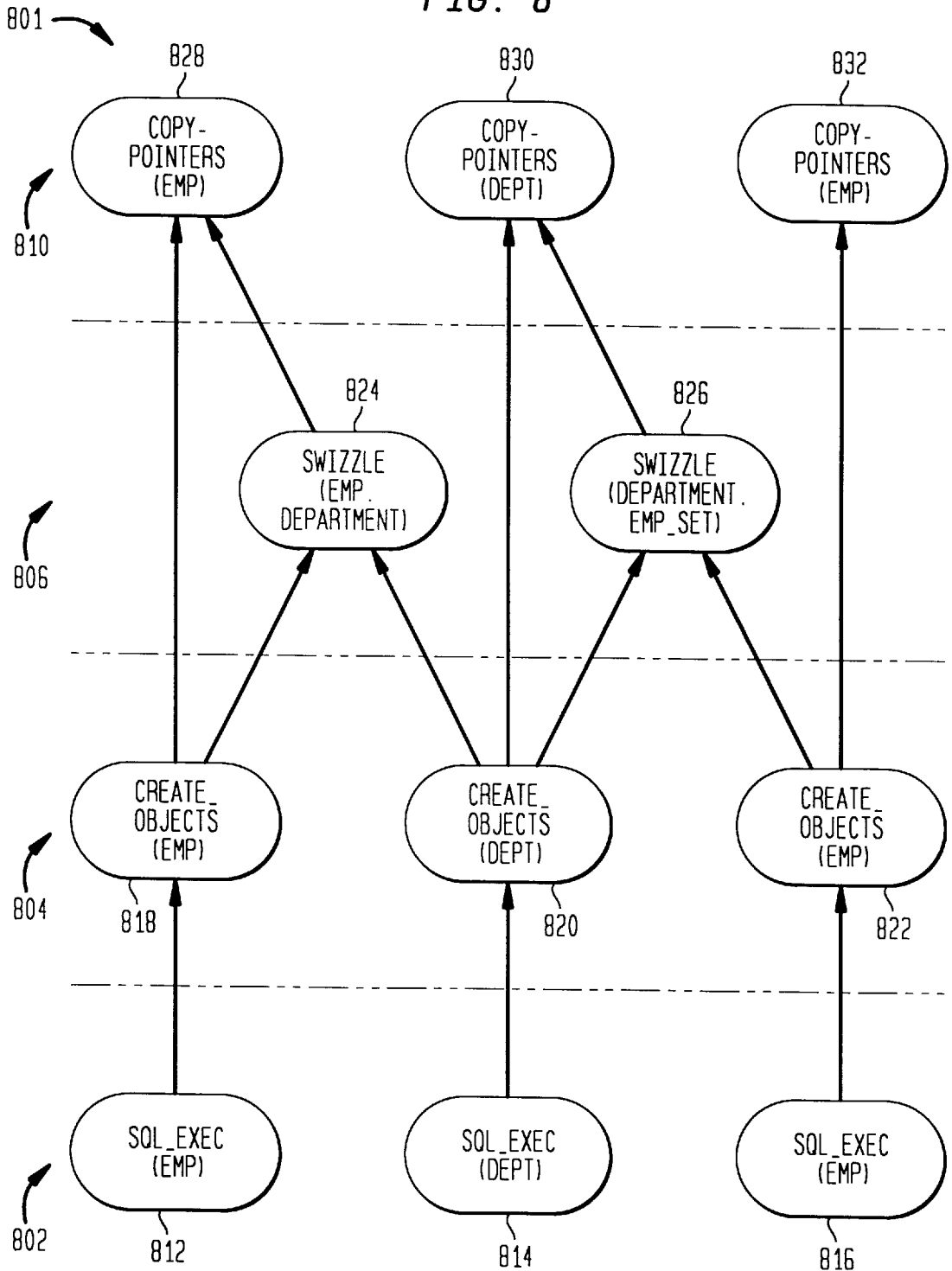
FIG. 8 illustrates an example directed acyclic graph (DAG) according to an embodiment of the present invention.

FIG. 8 illustrates an example directed acyclic graph (DAG) 801 according to a preferred embodiment of the present invention. The following comments are directed specifically to the DAG 801 shown in FIG. 8, although they apply to all DAGs. In the following discussion, reference shall also be made to a flowchart 902 in FIG. 9 which represents the operation of the object generator 404 while creating and executing a DAG, such as DAG 801.

The DAG 801 includes four types of nodes: relational query execution nodes 802, object creation nodes 804, swizzle nodes 806, and copy pointers nodes 810. The dag nodes 802, 804, 806, and 810 are preferably implemented using a set of generic virtual base classes and a corresponding set of derived classes that inherit from the generic classes. The dag nodes are preferably instances of the derived classes.

Preferably, the object generator 404 first creates the relational query execution nodes 802 (step 906), then creates the object creation nodes 804 (step 908), then creates the swizzle nodes 806 (step 910), and then creates the copy pointers nodes 810 (step 912). The object generator 404 also executes the nodes in this order. In particular, the object generator 404 first executes the relational query execution nodes 802 (step 914), then executes the object creation nodes 804 (step 916), then executes the swizzle nodes 806 (step 918), and then executes the copy pointers nodes 810 (step 920).

The relational query execution nodes 802, such as SQL_exec nodes 812, 814, and 816, collectively represent the relational queries 410 generated by the query generator 402. The object generator 404 distributes these relational queries 410 among the SQL_exec nodes 812, 814, and 816 when creating these nodes. This distribution is based on the nested prefetch structure. For example, suppose that the top-level class is "Emp", and the prefetch paths include the following: "Emp.department" and "department.emp_set". In this example, the nested prefetch structure would be as follows:

[department, {[emp_set, {}]}]

The relational queries (generated by the query generator 402) that are directed to retrieve employee tuples for the "Emp.department" prefetch path component would be associated with one relational query execution node 802, in this case SQL_exec node 812. The relational queries that are directed to retrieve dept tuples for the "Emp.department" prefetch path component would be associated with another relational query execution node 802, in this case SQL_exec node 814. The relational queries that are directed to retrieve employee tuples for the "department.emp_set" prefetch path component would be associated with another relational query execution node 802, in this case SQL_exec node 816.

More generally, the manner in which the relational queries 410 are distributed among the relational query execution nodes 802 is as follows. For every relational query, one relational query execution node 802 is created to execute that relational query and to retrieve tuples. A relation query execution node is connected to an object creation node of a class if the relational query retrieves base attributes of that class. In case a relational query retrieves pure swizzling information, it is connected to an object creation node that will only create intermediate objects. No application objects are created from pure swizzling information.

The object generator 404 executes a relational query execution node 802, such as SQL_exec node 812, by transferring the relational queries associated with the SQL_exec node 812 to the RDBMS 112, causing the RDBMS 112 to process these relational queries, and then receiving the tuples which the RDBMS 112 retrieved as a result of processing these relational queries. These tuples are transferred to the object creation node 804 (in this case, create_objects node 818) that is associated (linked) with the SQL_exec node 812.

The object generator 404 creates one object creation node 804 (of type class C) for each relational query execution node 802 that retrieves base attributes of class C. Each object creation node 804 is said to be linked (or associated with) one of the relational query execution nodes 802 (for example, SQL_exec node 812 is linked to create_objects node 818).

The object creation nodes 804, such as create-objects nodes 818, 820, and 822, cause the object generator 404 to create application objects 414 for the tuples respectively transferred from the relational query execution nodes 802. For example, the create_objects node 818 causes the object generator 404 to create application objects 414 for the tuples transferred from the SQL_exec node 812. The instantiation of duplicate application objects is avoided by using the object tables, as discussed above. Also, new entries in the respective object tables are created for the new application objects.

Figure 11:
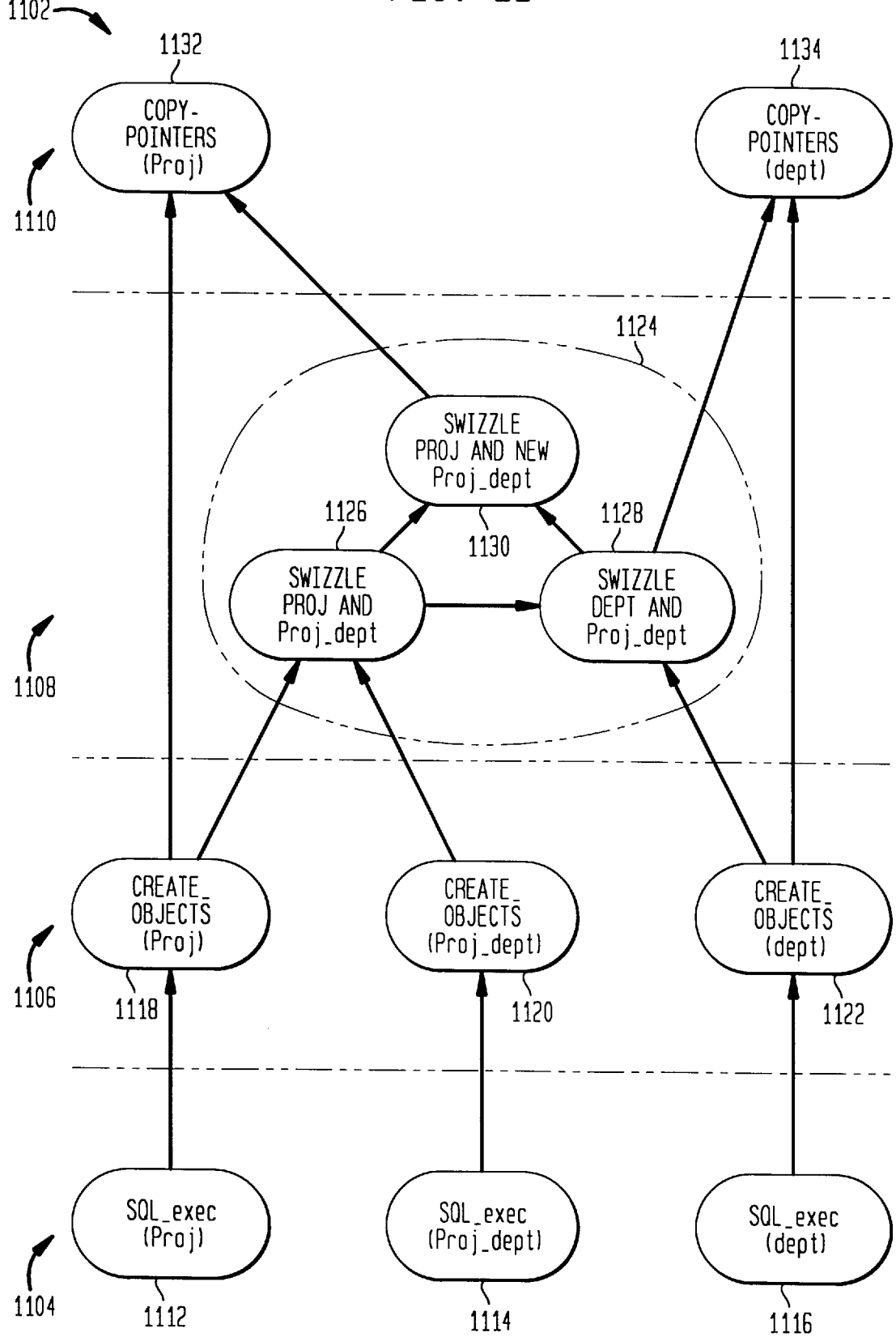
FIG. 11 illustrates another example directed acyclic graph (DAG) according to an embodiment of the present invention.

Application objects 414 are not created for tuples that were retrieved from the RDBMS 112 only for swizzling purposes (i.e., tuples retrieved from intermediate tables which do not map to any classes in the object schema). This information (i.e., which tuples are used merely for swizzling purposes) is inferred by the nested prefetch structure. While creating the relational queries from analyzing the object query and prefetch paths in the query generator 402, it is clear that some queries contain only foreign keys in the SELECT clause (i.e., no base attribute information for any class is retrieved using these queries). Queries retrieving only foreign key information are used purely for swizzling. An example of such a query is a relational query that retrieves tuples from an intermediate table like the second relational query 1404 in FIG. 14. Since queries like 1404 are not needed for creating objects, the relational query execution nodes 802 corresponding to such queries are connected to create_objects nodes that only create intermediate objects and no application objects. An example of such a DAG node connection is shown in FIG. 11 where the SQL_exec_node 1114 corresponding to the intermediate table proj-dept is directly connected to the create_objects node 1120 that will only create intermediate objects as described below.

The object creation nodes 804 also cause the object generator 404 to create intermediate objects for the application objects that are involved in swizzling (as described above). The object generator 404 identifies application objects that are involved in swizzling by the help of information that is stored in the object creation nodes 804 during the creation of the DAG structure. This information can also be generated by looking at information in the swizzle nodes that are connected to an object creation node.

The object generator 404 creates a swizzle node 806 for each swizzle indicated by the nested prefetch structure. For example, suppose that the nested prefetch structure is as follows:

[department, {[emp_set, {}]}]

This corresponds to a top-level class of "Emp", and the following prefetch paths: "Emp.department" and "department.emp_set" (this example is reflected in FIG. 8). The Emp.department prefetch path component indicates a swizzle between employee tuples and dept tuples. The department.emp_set prefetch path component indicates a swizzle between dept tuples and employees tuples. Thus, the object generator 404 creates two swizzle nodes 806, i.e., swizzle node 824 (corresponding to the Emp.department prefetch path component) and swizzle node 826 (corresponding to the department.emp_set prefetch path component).

The swizzle nodes 824, 826 are said to be linked to (or associated with) the create object nodes 804 which create the intermediate objects that are respectively processed by the swizzle nodes 824, 826. For example, create_object nodes 818, 820 create the intermediate objects for the swizzle indicated by the Emp.department prefetch path component. Accordingly, swizzle node 824 is associated with these create_object nodes 818, 820.

The swizzle nodes 806, such as swizzle nodes 824 and 826, cause the object generator 404 to swizzle the intermediate objects which they received from the object creation nodes 804. According to the present invention, for performance reasons, the object generator 404 performs swizzling by: (a) converting foreign keys to pointers or sets of pointers; and (b) setting relationship attributes in the intermediate objects equal to these pointers.

The object generator 404 creates a copy pointers node 810 for each relational query execution node 802 that operates to retrieve tuples from relational tables that map to classes in the object schema. The object generator 404 does not create copy pointers nodes 810 for relational query execution nodes 802 which retrieve tuples from intermediate tables (such as SQL_exec node 1114 in FIG. 11).

The copy pointers nodes 810, such as copy_pointers nodes 828, 830, and 832, cause the object generator 404 to copy the reference/relationship data members (i.e., pointers) in the intermediate objects to corresponding reference/relationship attributes in the application objects.

Figure 10A:
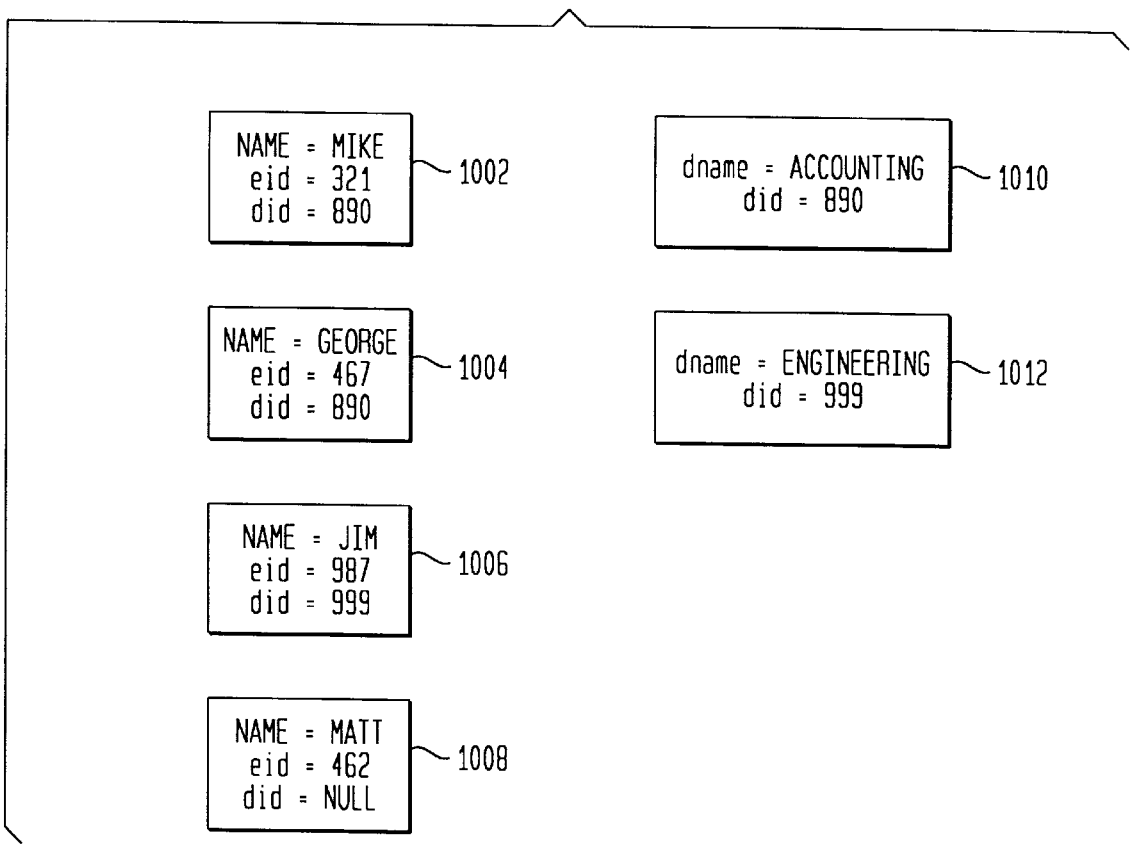
FIGS. 10A–10D are used to describe the effect of processing the DAG in FIG. 8.

The operation of the object generator 404 shall now be further illustrated by considering an example scenario shown in FIG. 10A, which corresponds to the DAG 801 of FIG. 8. This example focuses on the Emp.department prefetch path, and the nodes in the DAG 801 that are associated with this prefetch path. The manner in which the object generator 404 operates when processing DAG nodes related to the department.emp_set prefetch path component will be apparent to persons skilled in the relevant art based on the discussion contained herein.

Assume that the SQL_exec node 812 includes a query similar to the first relational query 1302 in FIG. 13, and the SQL_exec node 814 includes a query similar to the second relational query 1304 in FIG. 13. Also assume that the object generator 404 has processed the SQL_exec node 812 (step 914) and, as a result, has received from the RDBMS 112 employee tuples 1002, 1004, 1006, and 1008. Note that these employee tuples 1002, 1004, 1006, and 1008 have been sorted by did in the RDBMS 112 (it is preferred to perform as much sorting as possible in the RDBMS 112 because, generally, the RDBMS 112 can perform such sorting operations more efficiently than the object generator 404). The object generator 404 has also processed the SQL_exec node 814 (step 914) and, as a result, has received from the RDBMS 112 dept tuples 1010 and 1012. These dept tuples 1010 and 1012 have been sorted by did in the RDBMS 112.

Figure 10B:
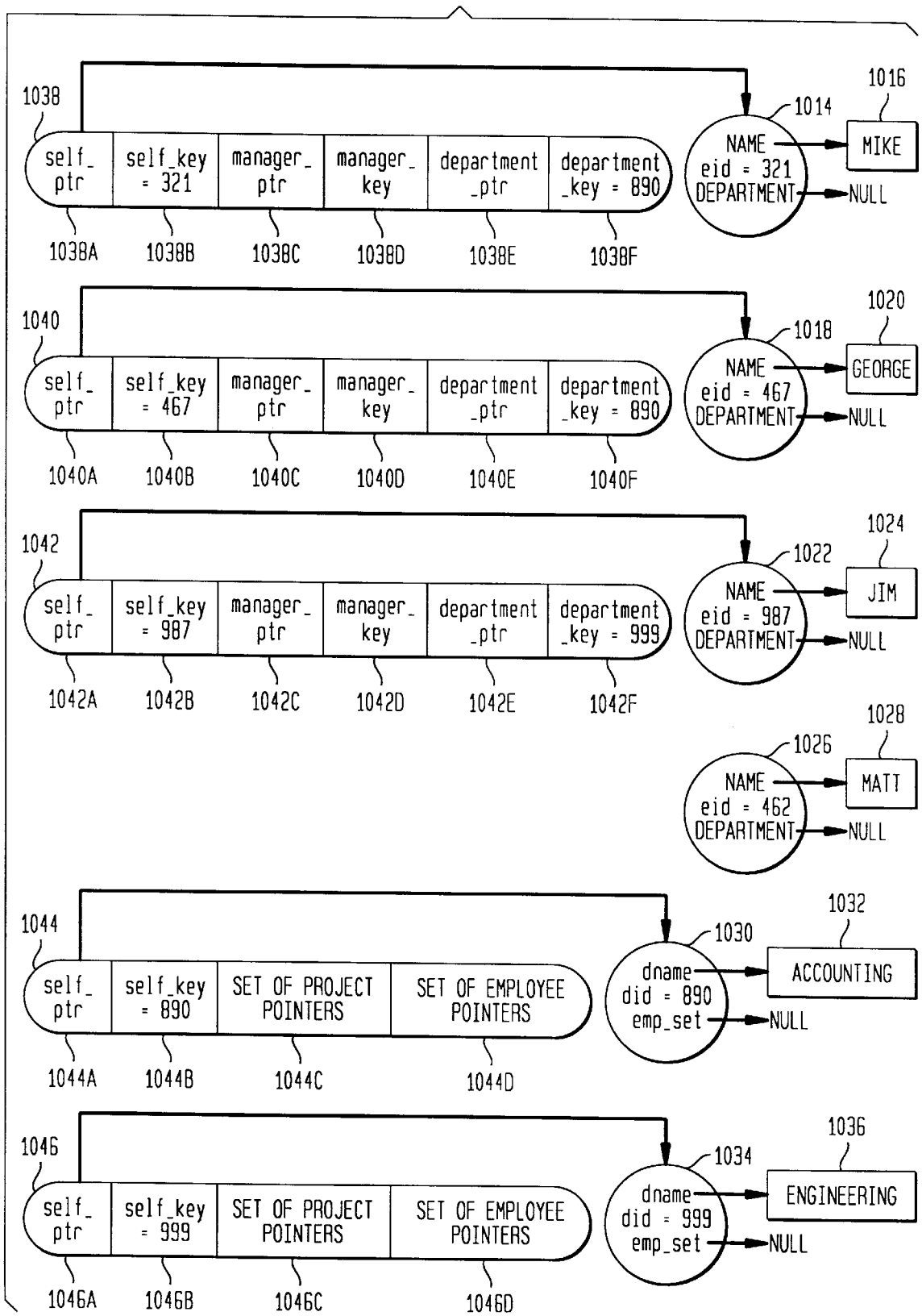

Referring now to FIG. 10B, the object generator 404 processes the create_objects nodes 818 and 820 (step 916). In doing so, the object generator 404 generates application Emp objects 1014, 1018, 1022, 1026 which correspond to employee tuples 1002, 1004, 1006, and 1008, respectively. The object generator 404 also generates application Dept objects 1030 and 1034 which correspond to dept tuples 1010 and 1012, respectively. The object generator 404 initializes the base attributes of these application objects 1014, 1018, 1022, 1026, 1030, 1034 (however, the relationship attributes cannot be set at this point).

Also, the object generator 404 creates intermediate objects 1038, 1040, 1042, 1044, 1046 for application objects 1014, 1018, 1022, 1030, 1034, respectively. The object generator 404 does not create an intermediate object for application Emp object 1026, since this application object 1026 is not involved in any swizzling operations (this is the case, since the did field in the corresponding employee tuple 1008 is equal to a null value).

The object generator 404 sets the self_ptr and self_key fields for each of the intermediate objects 1038, 1040, 1042, 1044, and 1046. The object generator 404 also sets the department_key field in the Emp intermediate objects 1038, 1040, 1042, since this information is contained in the corresponding employee tuples 1002, 1004, 1006, respectively.

Figure 10C:
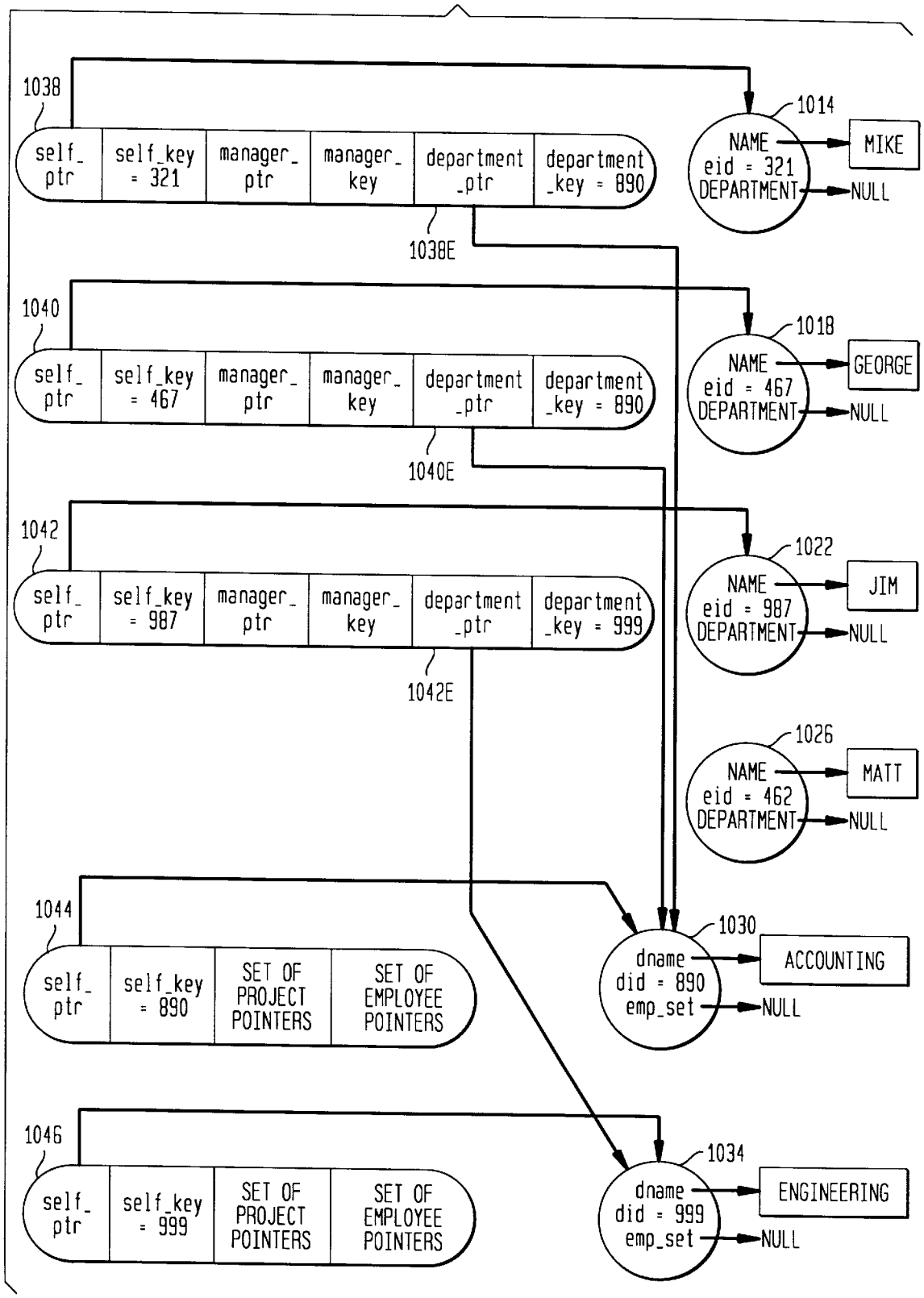

The object generator 404 then processes the swizzle node 824 (step 918). The results of such processing is shown in FIG. 10C. While processing the swizzle node 824, the object generator 404 sets the department_ptr fields in the Emp intermediate objects 1038, 1040, 1042. In other words, the object generator 404 converts the foreign keys (did) to pointers.

The object generator 404 does this by merging the Emp intermediate objects 1038, 1040, 1042 with the Dept intermediate objects 1044, 1046. This merging operation is facilitated since all of the Emp intermediate objects 1038, 1040, 1042 are sorted by department key and all of the department intermediate objects 1044, 1046 are sorted by self_key (this is the case, since the original employee tuples 1002, 1004, 1006 are sorted by did used to set department key of Emp intermediate objects and the original department tuples 1010, 1012 are sorted by did used to set self_key of the department intermediate objects).

Specifically, the object generator 404 compares the department key in each Emp intermediate object 1038, 1040, 1042 to the self_keys in the Dept intermediate objects 1044, 1046. When a match is found, the object generator 404 copies the self_ptr from the matching Dept intermediate object 1044 or 1046 to the department_ptr in the corresponding Emp intermediate object 1038, 1040, or 1042. The object generator 404 processes each Emp intermediate object 1038, 1040, 1042 in this way.

Figure 10D:
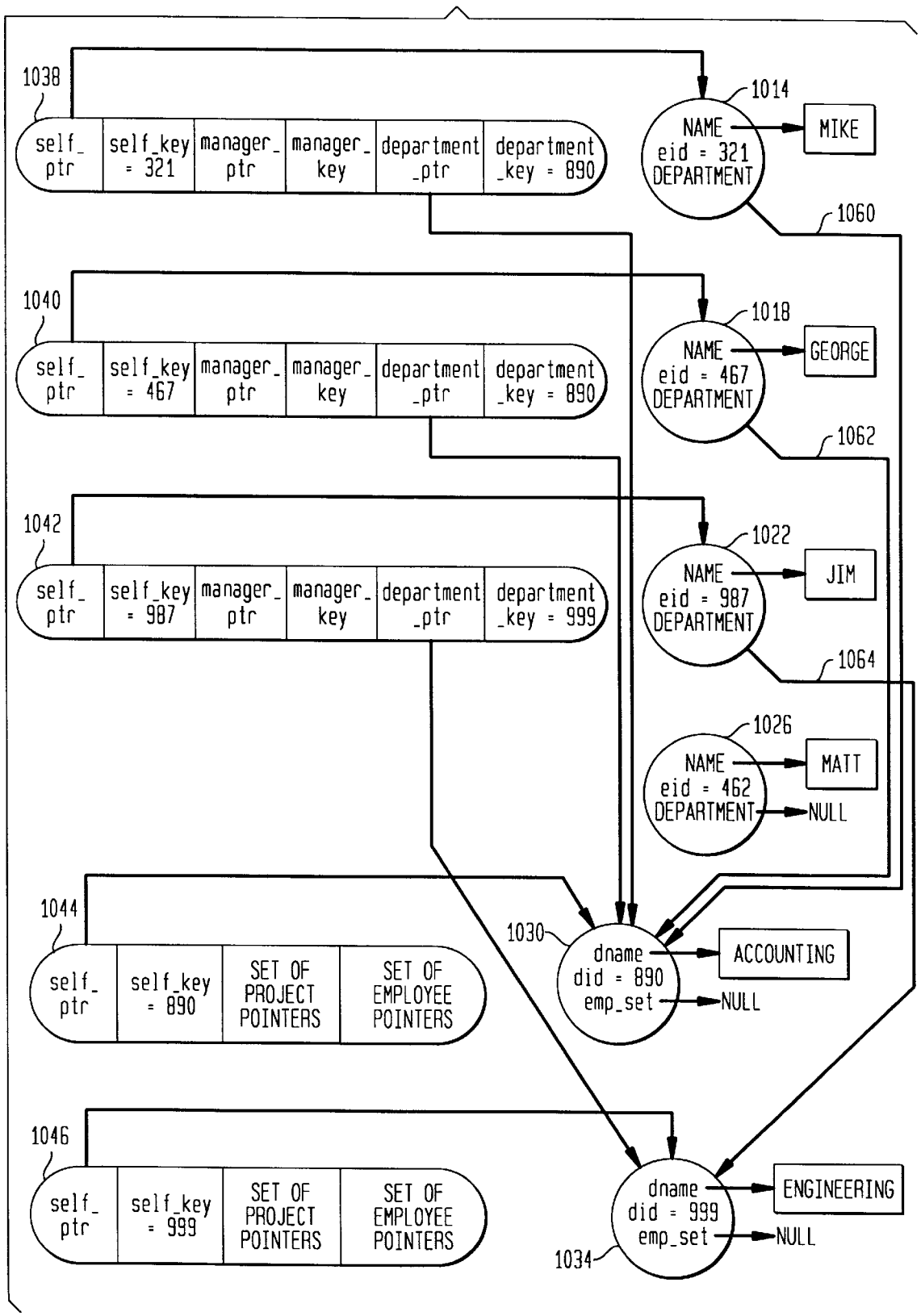

The object generator 404 then processes the copy_pointers node 828 (step 920). The results of such processing is shown in FIG. 10D. When processing the copy_pointers node 828, the object generator 404 copies the department_ptrs from the Emp intermediate objects 1038, 1040, 1042 to the department pointers in the corresponding Emp application objects 1014, 1018, 1022, respectively. The Emp intermediate objects will be sorted, if necessary, to be in the same order as the application objects so as to minimize any thrashing that could be caused in accessing application objects in a random order (especially if there are large numbers of objects).

Many-to-Many Relationships

The above description applies to how the object generator 404 operates when a 1-to-many relationship is involved. The above description also applies to how the object generator 404 operates when a 1-to-1 relationship is involved, since a 1-to-1 relationship is a subset of a 1-to-many relationship. The operation of the object generator 404 when a many-to-many relationship is involved shall now be discussed.

The operation of the object generator 404 when processing a many-to-many relationship is very similar to when it is processing 1-to-many relationships. In particular, the object generator 404 first creates a directed acyclic graph (DAG), and then executes the DAG.

FIG. 11 illustrates an example directed acyclic graph (DAG) 1102 according to a preferred embodiment of the present invention. As in the 1-to-many case, the DAG 1102 includes four types of nodes: relational query execution nodes 1104, object creation nodes 1106, swizzle nodes 1108, and copy pointers nodes 1110. These DAG nodes 1104, 1106, 1108, and 1110 are very similar to the DAG nodes in the 1-to-many case.

The only significant difference is the swizzle node 1124, which must be constructed so as to handle a many-to-many swizzle. According to the present invention, the swizzle node 1124 performs a three step swizzle operation, corresponding to sub-swizzle nodes 1126, 1128, and 1130.

Consider a swizzle operation involving a many-to-many relationship between objects of a first class and objects of a second class, where such relationships are defined by tuples in an intermediate table. Sub-swizzle node 1126 causes the object generator 404 to swizzle intermediate objects of the first class with intermediate objects derived from the intermediate table (relationship/reference attributes in the objects of the first class are not filled in at this point). Sub-swizzle node 1128 causes the object generator 404 to swizzle intermediate objects of the second class with the intermediate objects derived from the intermediate table. Relationship/reference attributes in the objects of the second class are filled in at this point. Sub-swizzle node 1130 causes the object generator 404 to further swizzle intermediate objects of the first class with the intermediate objects derived from the intermediate table, where relationship/ reference attributes in the objects of the first class are filled in at this point.

Figure 9:
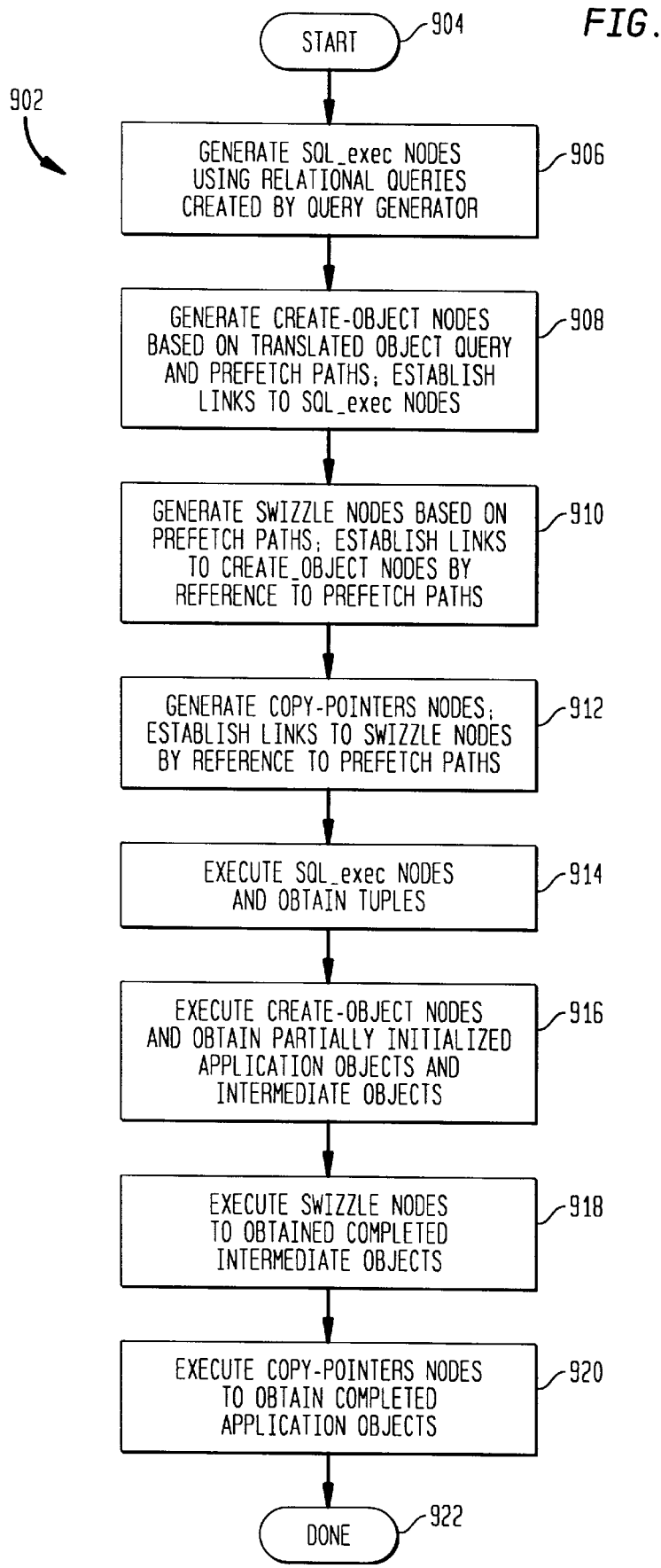
FIG. 9 is a flowchart depicting the manner in which the present invention translates tuples to objects.

Preferably, the object generator 404 creates and processes the DAG 1102 according to the flowchart 902 in FIG. 9 (described above). In particular, the object generator 404 creates the relational query execution nodes 1104 (step 906), then creates the object creation nodes 1106 (step 908), then creates the swizzle nodes 1108 (step 910), and then creates the copy pointers nodes 1110 (step 912). The object generator 404 also executes the nodes in this order. In particular, the object generator 404 first executes the relational query execution nodes 1104 (step 914), then executes the object creation nodes 1106 (step 916), then executes the swizzle nodes 1108 (step 918), and then executes the copy pointers nodes 1110 (step 920).

Figure 12A:
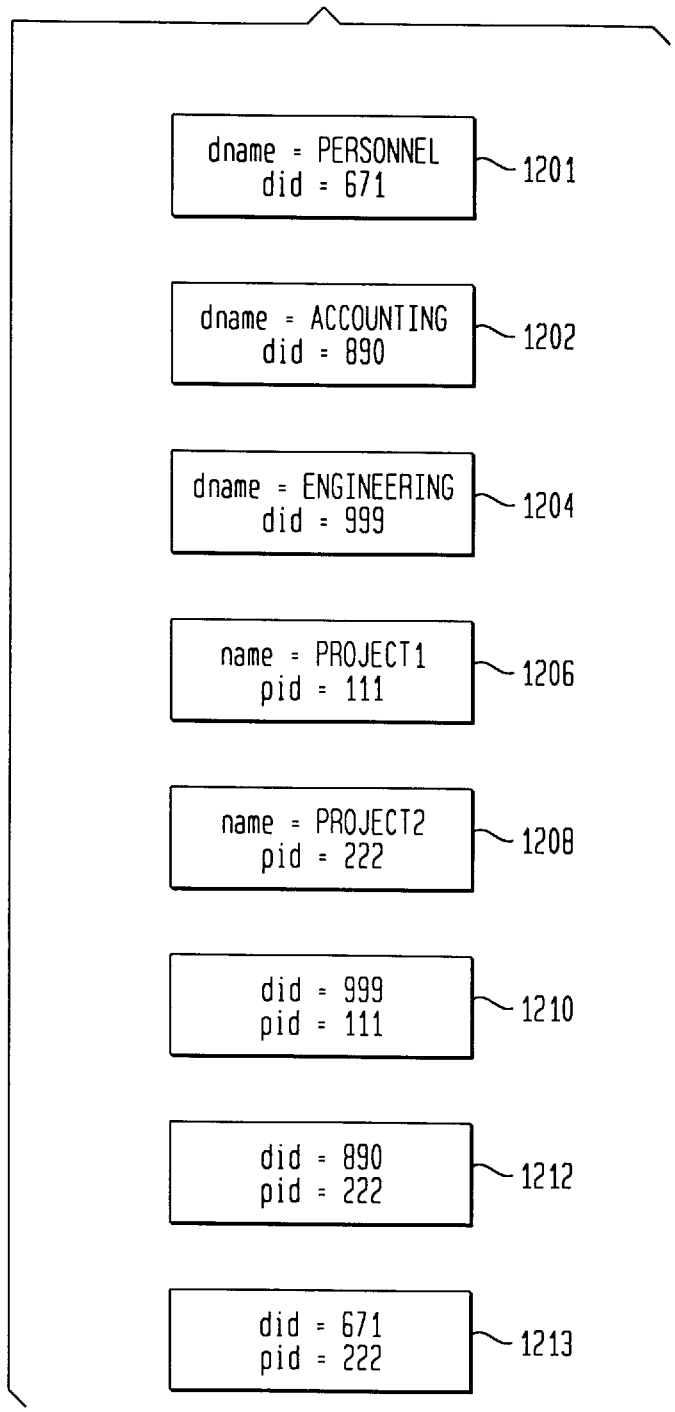
FIGS. 12A–12E are used to describe the effect of processing the DAG in FIG. 11.

The operation of the object generator 404 when processing a many-to-many relationship shall now be further illustrated by considering an example scenario shown in FIG. 12A, which corresponds to the DAG 1102 of FIG. 11. This example is based on a Proj.dept_set prefetch path, and the nodes in the DAG 1102 reflect this prefetch path. The relational queries shown in FIG. 14 are similar to those which the query generator 402 would generate in accordance with this prefetch path.

Assume that the object generator 404 has processed the SQL_exec node 1112 (step 914) and, as a result, has received from the RDBMS 112 dept tuples 1201, 1202, 1204 (preferably sorted by did in the RDBMS 112). Also assume that the object generator 404 has processed the SQL_exec node 1114 (step 914) and, as a result, has received from the RDBMS 112 proj_dep tuples 1210, 1212, and 1213 (preferably sorted by pid in the RDBMS 112). proj_dep is the intermediate table. Further assume that the object generator 404 has processed the SQL_exec node 1116 (step 914) and, as a result, has received from the RDBMS 112 project tuples 1206 and 1208 (preferably sorted by pid in the RDBMS 112).

Figure 12B:
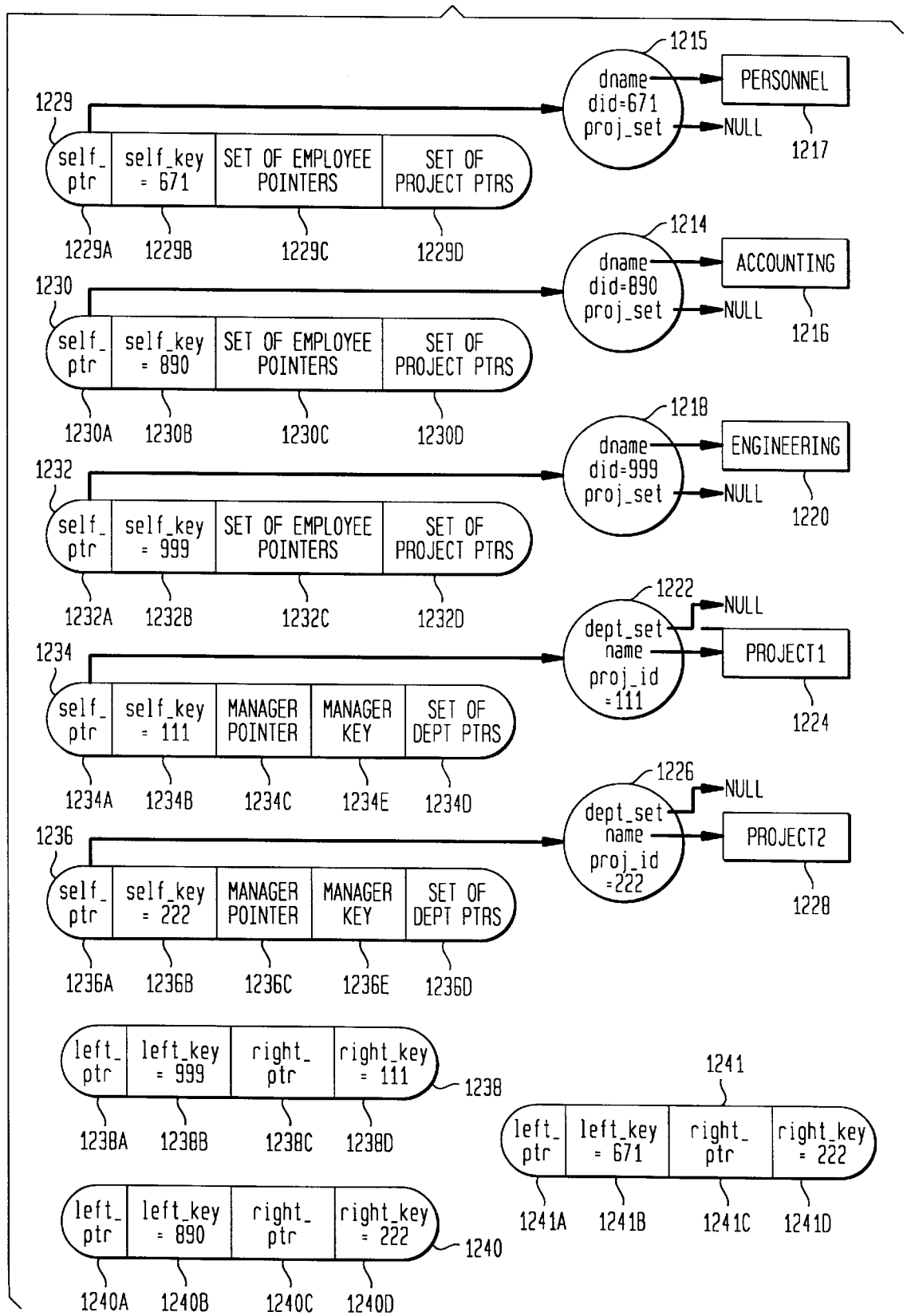

Referring now to FIG. 12B, the object generator 404 processes the create_objects nodes 1118, 1120, 1122 (step 916). In doing so, the object generator 404 generates application dept objects 1214, 1215, and 1218 which correspond to dept tuples 1201, 1202, and 1204, respectively. The object generator 404 also generates application proj objects 1222 and 1226 which correspond to project tuples 1206 and 1208, respectively. The object generator 404 initializes the base attributes of these application objects 1214, 1215, 1218, 1222, and 1226 (however, the relationship attributes cannot be set at this point). Note that the object generator 404 does not generate application objects for the intermediate table proj_dep tuples 1210, 1212, and 1213.

Also, the object generator 404 creates intermediate objects 1229, 1230, 1232, 1234, 1236 for application objects 1215, 1214, 1218, 1222, 1226, respectively. The object generator 404 sets the self_ptr and self_key fields for each of these intermediate objects 1229, 1230, 1232, 1234, 1236.

Further, the object generator 404 creates intermediate objects 1238, 1240, 1241 to represent the intermediate table proj_dep tuples 1210, 1212, and 1213, respectively. Each of these intermediate objects 1238, 1240, 1241 includes four fields: a left_ptr, left_key, right_ptr, and right_key. One of the classes involved in the many-to-many swizzle is arbitrarily designated "left." The other class involved in the many-to-many swizzle is arbitrarily designated "right." The object generator 404 sets the left_key and right_key fields in these intermediate objects 1238, 1240, 1241 using information contained in the intermediate table proj_dep tuples 1210, 1212, and 1213, respectively.

The object generator 404 then processes the swizzle node 1108 (step 918). As noted above, the processing of the swizzle node 1108 involves the processing of sub-swizzle nodes 1126, 1128, and 1130. Such processing shall now be described.

Figure 12C:
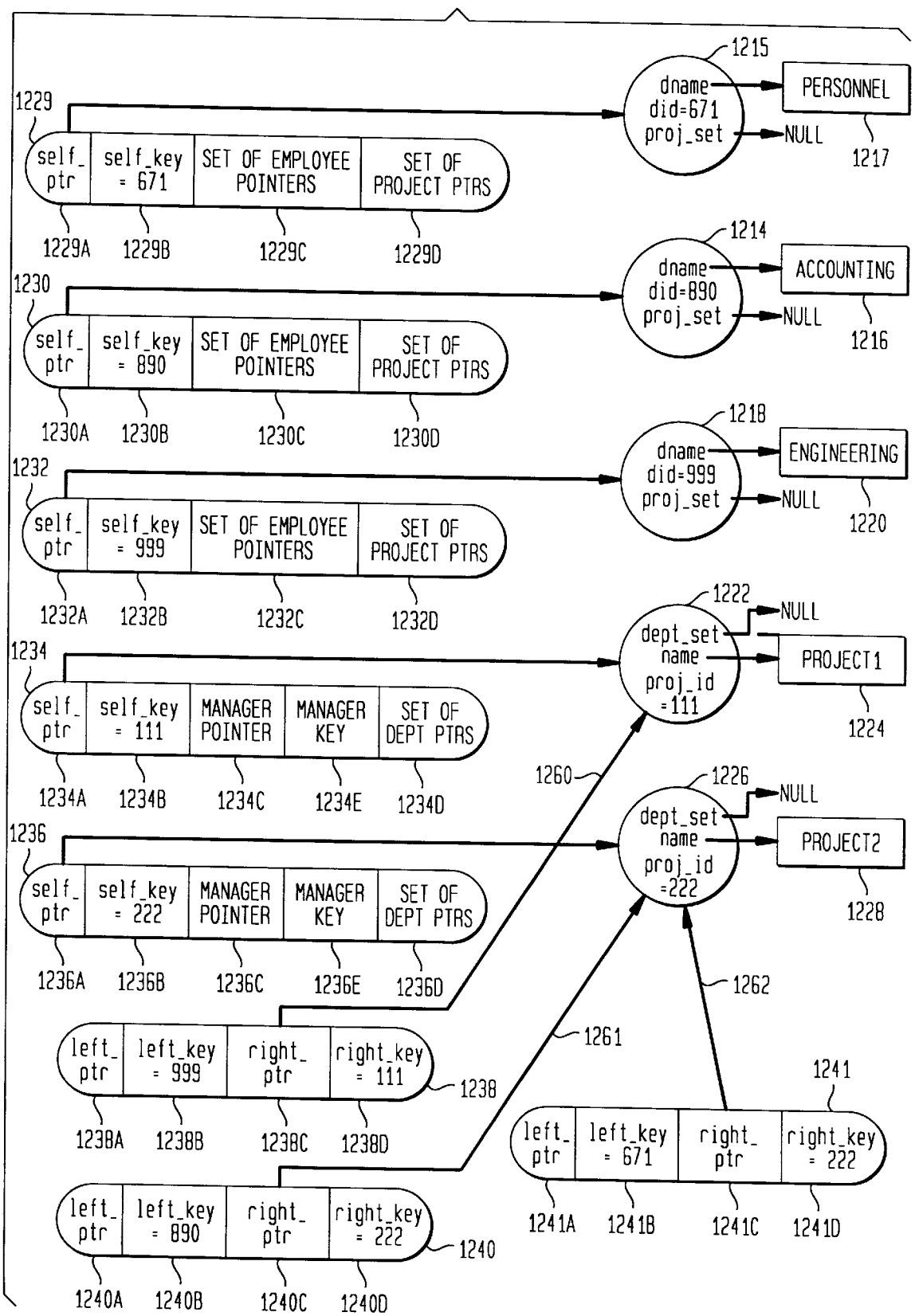

First, the object generator 404 processes the sub-swizzle node 1126, where the proj intermediate objects 1234, 1236 are swizzled with the intermediate objects 1238, 1240, 1241 (derived from the intermediate table proj_dep tuples 1210, 1212, and 1213). While processing the sub-swizzle node 1126, the object generator 404 sets the right_ptr fields in the intermediate objects 1238, 1240, 1241. In this case, the class proj has been designated as "right." Thus, the object generator 404 sets the right_ptr fields in the intermediate objects 1238, 1240, 1241 to point to the proj application objects 1222, 1226, 1226, respectively. This is shown in FIG. 12C.

The object generator 404 does this by merging the proj intermediate objects 1234, 1236 with the intermediate objects 1238, 1240, 1241 (this merging operation is described above). This merging operation is facilitated since all of the proj intermediate objects 1234, 1236 are sorted by self_key, and all of the proj_dep intermediate objects 1238, 1240, 1241 are sorted by right key (this is the case, since the original project tuples 1206, 1208 are sorted by proj_id used to set self_key of proj intermediate objects and the original proj_dep tuples are sorted by pid used to set right_key of the proj_dep intermediate objects). After the merge operation has been performed, the object generator 404 sorts the intermediate objects 1238, 1240, 1241 by did (i.e., the left_key), that is, the primary key of the class (in this case, dept) which is involved in the swizzling operation of the next sub-node, sub-swizzle node 1128.

The object generator 404 then processes the sub-swizzle node 1128, where the dept intermediate objects 1229, 1230, 1232 are swizzled with the intermediate objects 1238, 1240, 1241 as modified during the processing of sub-swizzle node 1126. While processing the sub-swizzle node 1128, the object generator 404 sets the left_ptr fields in the intermediate objects 1238, 1240, 1241. In this case, the class dept has been designated as "left." Thus, the object generator 404 sets the left_ptr fields in the intermediate objects 1238, 1240, 1241 to point to the dept application objects 1218, 1214, 1215, respectively.

The object generator 404 does this by merging the dept intermediate objects 1229, 1230, 1232 with the intermediate objects 1238, 1240, 1241. This merging operation is facilitated since all of the department intermediate objects 1229, 1230, 1232 are sorted by self key (did) and all of the proj_dep intermediate objects 1238, 1240, 1241 are sorted by left_key (this is the case, since the original department tuples 1201, 1202, 1204 are sorted by did used to set self_key of department intermediate objects and the proj_dep tuples were sorted by did (the left_key) in the step described above).

Figure 12D:
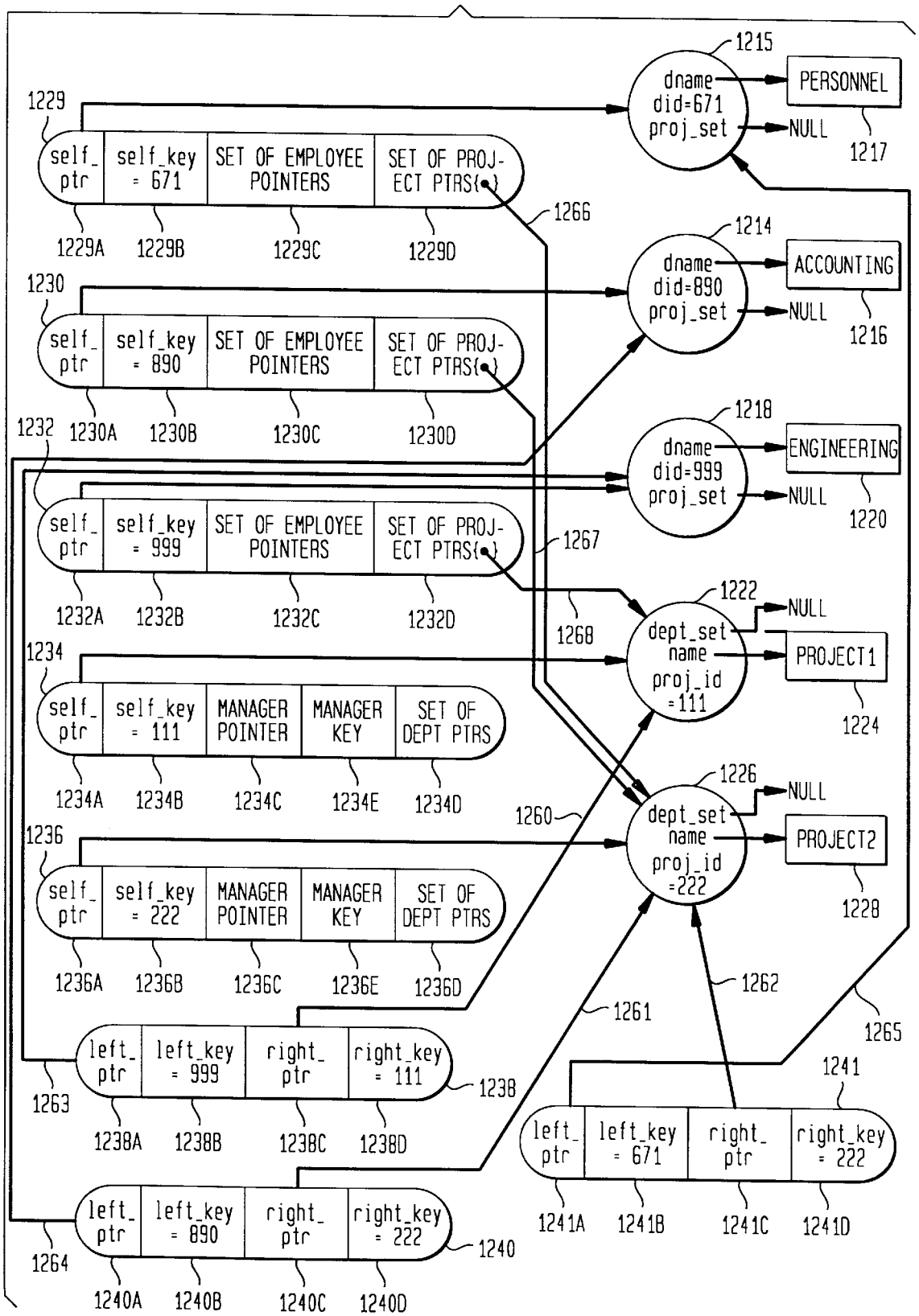

Also, the object generator 404 sets the "set of project ptrs" field in the dept intermediate objects 1229, 1230, 1232. This can be done, since this pointer information is now contained in the intermediate objects 1238, 1240, 1241. This is shown in FIG. 12D.

After the above merge operations have been performed, the object generator 404 sorts the intermediate objects 1238, 1240, 1241 by pid (i.e., the right_key), that is, the primary key of the class (in this case, proj) which is involved in the swizzling operation of the next sub-node, sub-swizzle node 1130.

Figure 12E:
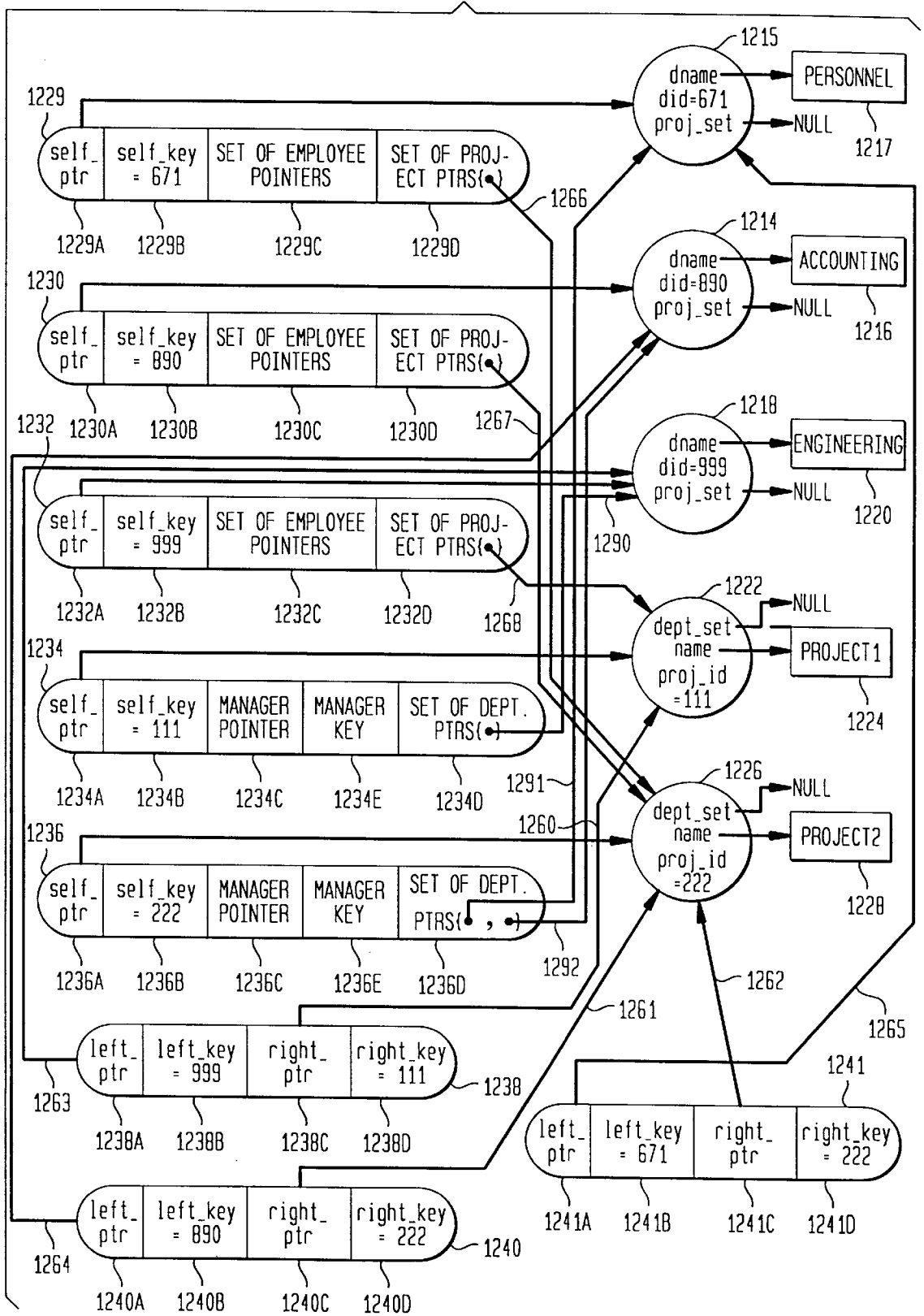

The object generator 404 then processes the sub-swizzle node 1130, where the proj intermediate objects 1234 and 1236 are swizzled with the intermediate objects 1238, 1240, 1241 as modified during the processing of sub-swizzle node 1128. While processing the sub-swizzle node 1130, the object generator 404 sets the "set of dept ptrs" field in the proj intermediate objects 1234 and 1236. This can be done, since this pointer information is now contained in the intermediate objects 1238, 1240, 1241. This is shown in FIG. 12E.

The object generator 404 then processes the copy_pointers nodes 1132 and 1134 (step 920). When processing the copy_pointers node 1132, the object generator 404 copies the pointers from the "set of dept ptrs" field in the proj intermediate objects 1234, 1236 to the dept_set pointers in the corresponding proj application objects 1222, 1226, respectively.

When processing the copy_pointers node 1134, the object generator 404 copies the pointers from the "set of project ptrs" field in the dept intermediate objects 1229, 1230, 1232 to the proj_set pointers in the corresponding dept application objects 1215, 1214, 1218, respectively.

Query and Cursor Plans

The present invention supports both query access and cursor access. In query access, the application 104 provides an object query and prefetch paths to the gateway 106, and the gateway 106 processes the object query and prefetch paths in a batch mode. In cursor access, the application 104 provides an object query and prefetch paths to the gateway 106, and the gateway 106 processes the object query and prefetch paths one step at a time (stepwise mode).

For example, if the DAG 1102 in FIG. 11 was executed in query mode, then all of the DAG nodes contained therein would be processed without interaction from the application or user. If, instead, the DAG 1102 was executed in cursor mode, then the DAG 1102 would be executed one step at a time (i.e., only processing sufficient to retrieve the top-level application object is performed at each iteration), and user interaction (such as a "continue" or "next" command) would be required after each top-level object was retrieved.

Preferably, a query version and a cursor version exists for the relational query execution nodes 1104, object creation nodes 1106, swizzle nodes 1108, and copy pointers nodes 1110. The query version operates in batch mode, and the cursor version operates in stepwise mode. (Some DAGs that correspond to complex prefetch path combinations cannot be executed in stepwise mode. In such cases, the operations are executed in batch mode, and the results are saved until requested for by the user or application.) Implementation and use of such query and cursor versions will be apparent to persons skilled in the relevant art based on the discussion contained herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer program product comprising a computer readable medium having computer program logic recorded thereon for enabling a processor in a computer system to provide access to a database management system from an object-oriented environment, the database management system including a plurality of tuples, said computer program product comprising:

receiving means for enabling said processor to receive an object query from the object oriented environment;

first generating means for enabling said processor to generate a set of relational database queries in response to receiving the object query, said set of relational database queries used to retrieve tuples from the database management system;

second generating means for enabling said processor to generate one or more application objects in response to receiving said tuples from the database management system, said second generating means comprising:

application object instantiation means for enabling said processor to instantiate said one or more application objects;

base attribute setting means for enabling said processor to set base attributes of said one or more application objects using information in said tuples;

intermediate object creating means for enabling said processor to create one or more intermediate objects using information in said tuples to represent relationship attributes of said one or more application objects requiring dereferencing; and relationship attribute setting means for enabling said processor to set relationship attributes in said one or more application objects by swizzling said intermediate objects.

2. The computer program product of claim 1, wherein said base attribute setting means comprises:

means for enabling said processor to set base attributes of said application objects using information in said tuples which map to said base attributes.

3. The computer program product of claim 1, wherein said intermediate object creating means comprises:

means for enabling said processor to select one of said application objects having relationship attributes requiring dereferencing;

means for enabling said processor to generate an intermediate object having a self pointer field, a self key field, a foreign pointer field, and a foreign key field;

means for enabling said processor to set said self pointer field to point to said selected application object; and means for enabling said processor to set said self key field to be equal to a primary key of a tuple that maps to said selected application object.

4. The computer program product of claim 3, wherein said intermediate object creating means further comprises:

means for enabling said processor to set said foreign key field equal to a foreign key stored in said tuple.

5. The computer program product of claim 4, wherein said relationship attribute setting means comprises:

means for enabling said processor to identify a second intermediate object having a self key field equal to said foreign key field of said first intermediate object; and means for enabling said processor to set said foreign pointer field of said first intermediate object equal to a self pointer field of said second intermediate object.

6. The computer program product of claim 5, wherein said relationship attribute setting means further comprises:

means for enabling said processor to set a relationship attribute of said selected application object equal to said foreign pointer field of said first intermediate object.

7. The computer program product of claim 1, wherein said application object instantiation means comprises:

means for enabling said processor to select one of said tuples;

means for enabling said processor to reference an object table to determine whether an application object associated with said selected tuple already exists; and means for enabling said processor to instantiate a new application object for said selected tuple if one does not already exist.

8. The computer program product of claim 7, wherein said application object instantiation means further comprises:

means for enabling said processor to create a new entry in said object table to represent said new application object.

9. The computer program product of claim 1, wherein said intermediate object creating means comprises:

means for enabling said processor to generate a first intermediate object to represent a first application object of a first class, said first application object having a relationship attribute requiring dereferencing according to a many-to-many relationship, said first intermediate object having a self pointer field, a self key field, and an array of foreign pointers field;

means for enabling said processor to generate a second intermediate object to represent a second application object of a second class, said second application object having a relationship attribute requiring dereferencing according to said many-to-many relationship, said second intermediate object having a self pointer field, a self key field, and an array of foreign pointers field;

means for enabling said processor to set said self pointer fields in said first and second intermediate objects to point to said first and second application objects, respectively; and means for enabling said processor to set said self key fields in said first and second intermediate objects to be equal to primary keys of tuples that map to said first and second application objects, respectively.

10. The computer program product of claim 9, wherein said first and second classes are the same.

11. The computer program product of claim 9, wherein said intermediate object creating means further comprises:

means for enabling said processor to generate IT (intermediate table) intermediate objects to represent tuples read from an intermediate table; and IT intermediate object initializing means for enabling said processor to initialize said IT intermediate objects from information contained in said intermediate table tuples such that each IT intermediate object indicates a link between an application object of said first class and an application object of said second class.

12. The computer program product of claim 11 in which each intermediate table tuple stores a first primary key identifying an application object of said first class, and a second primary key identifying an application object of said second class, wherein said IT intermediate object initializing means comprises:

means for enabling said processor to store in said IT intermediate objects first and second primary keys from intermediate table tuples respectively mapping to said IT intermediate objects.

13. The computer program product of claim 11, wherein said relationship attribute setting means comprises:

means for enabling said processor to initialize said array of foreign pointers field in said first and second intermediate objects by referring to information in said IT intermediate objects;

means for enabling said processor to set a relationship attributes array in said first application object equal to said array of foreign pointers field in said first intermediate object; and means for enabling said processor to set a relationship attributes array in said second application object equal to said array of foreign pointers field in said second intermediate object.

14. The computer program product of claim 1, further comprising means for storing a mapping schema which maps a schema for the database management system into a schema for the object oriented environment, and wherein said generating means generating one or more application objects comprises means for examining the mapping schema to determine attributes which are base attributes and which require dereferencing, the means for examining making the determination in response to receiving the object query.

15. The computer program product of claim 14, wherein the database management system is a relational database management system.

16. The computer program product of claim 15, wherein each intermediate object includes a foreign key pointer field for each of the foreign keys included in a relational table which maps to a class corresponding to said one or more application objects.

17. A program storage device readable by a machine, tangibly embodying a program of instructions executable by the machine to perform method steps for providing access to a database management system from an object-oriented environment, the database management system including a plurality of tuples, said method steps comprising:

receiving an object query from the object oriented environment;

generating a set of relational database queries in response to receiving the object query;

retrieving tuples from the database management system using said set of relational database queries;

generating one or more application objects in response to receiving said tuples from the database management system, the step of generating comprising the steps of:
(1) instantiating said one or more application objects;
(2) setting base attributes of said one or more application objects using information in said tuples;
(3) creating one or more intermediate objects using information in said tuples to represent relationship attributes of said one or more application objects requiring dereferencing; and
(4) setting relationship attributes in said one or more application objects by swizzling said intermediate objects.

18. The program storage device of claim 17, wherein step (2) comprises the step of:

setting base attributes of said application objects using information in said tuples which map to said base attributes.

19. The program storage device of claim 17, wherein step (3) comprises the steps of:

(a) selecting one of said application objects having relationship attributes requiring dereferencing;
(b) generating an intermediate object having a self pointer field, a self key field, a foreign pointer field, and a foreign key field;
(c) setting said self pointer field to point to said selected application object; and
(d) setting said self key field to be equal to a primary key of a tuple that maps to said selected application object.

20. The program storage device of claim 19, wherein step (3) further comprises the step of:

(e) repeating steps (a)–(d) for each of said application objects having relationship attributes requiring dereferencing.

21. The program storage device of claim 19, wherein step (3) further comprises the step of:
  (e) setting said foreign key field equal to a foreign key stored in said tuple.

22. The program storage device of claim 21, wherein step (4) comprises the steps of:
  (a) identifying a second intermediate object having a self key field equal to said foreign key field of said first intermediate object; and
  (b) setting said foreign pointer field of said first intermediate object equal to a self pointer field of said second intermediate object.

23. The program storage device of claim 22, wherein step (4) further comprises the step of:
  (c) setting a relationship attribute of said selected application object equal to said foreign pointer field of said first intermediate object.

24. The program storage device of claim 17, wherein step (1) comprises the steps of:
  (a) selecting one of said tuples;
  (b) referencing an object table to determine whether an application object associated with said selected tuple already exists; and
  (c) instantiating a new application object for said selected tuple if one does not already exist.

25. The program storage device of claim 24, wherein step (1) further comprises the step of:
  (d) repeating steps (a)–(c) for each of said tuples.

26. The program storage device of claim 24, wherein step (1) further comprises the step of:
  (d) creating a new entry in said object table to represent said new application object.

27. The program storage device of claim 17, wherein step (3) comprises the steps of:
  (a) generating a first intermediate object to represent a first application object of a first class, said first application object having a relationship attribute requiring dereferencing according to a many-to-many relationship, said first intermediate object having a self pointer field, a self key field, and an array of foreign pointers field;
  (b) generating a second intermediate object to represent a second application object of a second class, said second application object having a relationship attribute requiring dereferencing according to said many-to-many relationship, said second intermediate object having a self pointer field, a self key field, and an array of foreign pointers field;
  (c) setting said self pointer fields in said first and second intermediate objects to point to said first and second application objects, respectively; and
  (d) setting said self key fields in said first and second intermediate objects to be equal to primary keys of tuples that map to said first and second application objects, respectively.

28. The program storage device of claim 27, wherein said first and second classes are the same.

29. The program storage device of claim 27, wherein step (3) further comprises the steps of:
  (e) generating IT (intermediate table) intermediate objects to represent tuples read from an intermediate table; and
  (f) initializing said IT intermediate objects from information contained in said intermediate table tuples such that each IT intermediate object indicates a link between an application object of said first class and an application object of said second class.

30. The program storage device of claim 29 in which each intermediate table tuple stores a first primary key identifying an application object of said first class, and a second primary key identifying an application object of said second class, wherein step (f) comprises the step of:
  storing in said IT intermediate objects first and second primary keys from intermediate table tuples respectively mapping to said IT intermediate objects.

31. The program storage device of claim 29, wherein step (4) comprises the steps of:
  (a) initializing said array of foreign pointers field in said first and second intermediate objects by referring to information in said IT intermediate objects;
  (b) setting a relationship attributes array in said first application object equal to said array of foreign pointers field in said first intermediate object; and
  (c) setting a relationship attributes array in said second application object equal to said array of foreign pointers field in said second intermediate object.

32. The program storage device of claim 17, further comprising the step of storing a mapping schema which maps a schema for the database management system into a schema for the object oriented environment, and wherein the step of generating one or more application objects comprises the step of examining the mapping schema to determine attributes which are base attributes and which require dereferencing, the step of examining being performed in response to receiving the object query.

33. The program storage device of claim 32, wherein the database management system is a relational database management system.

34. The program storage device of claim 33, wherein each intermediate object includes a foreign key pointer field for each of the foreign keys included in a relational table which maps to a class corresponding to said one or more application objects.

* * * * *